US012428907B1

(12) United States Patent
Lu

(10) Patent No.: US 12,428,907 B1
(45) Date of Patent: Sep. 30, 2025

(54) AUTOMATIC DESCENDING STRUCTURE OF ROLLER SHADE FABRIC AND MANUALLY OPERATED ROLLER SHADE

(71) Applicant: Ningbo Zhenfei Decorated Curtain Co., Ltd., Zhejiang (CN)

(72) Inventor: Jiefei Lu, Zhejiang (CN)

(73) Assignee: Ningbo Zhenfei Decorated Curtain Co., Ltd., Yuyao (CN)

( * ) Notice: Subject to any disclaimer, the term of this patent is extended or adjusted under 35 U.S.C. 154(b) by 0 days.

(21) Appl. No.: 19/096,772

(22) Filed: Apr. 1, 2025

(30) Foreign Application Priority Data

Jun. 24, 2024 (CN) ......................... 202421444169.1
Jul. 9, 2024 (CN) ......................... 202421607861.1

(51) Int. Cl.

| | |
|---|---|
| ***E06B 9/78*** | (2006.01) |
| ***E06B 9/42*** | (2006.01) |
| ***E06B 9/88*** | (2006.01) |
| ***E06B 9/90*** | (2006.01) |
| *E06B 9/80* | (2006.01) |

(52) U.S. Cl.
CPC .................. *E06B 9/78* (2013.01); *E06B 9/42* (2013.01); *E06B 9/88* (2013.01); *E06B 9/90* (2013.01); *E06B 2009/804* (2013.01)

(58) Field of Classification Search
CPC ..... E06B 9/78; E06B 9/42; E06B 9/88; E06B 9/90; E06B 2009/804; E06B 2009/6809
See application file for complete search history.

(56) References Cited

U.S. PATENT DOCUMENTS

| | | | | |
|---|---|---|---|---|
| 4,653,567 A * | 3/1987 | Starcke | E06B 9/78 160/320 |
| 5,465,775 A * | 11/1995 | Biba | E06B 9/306 74/502 |
| 9,617,787 B2 * | 4/2017 | Bohlen | E06B 9/68 |
| 2012/0090795 A1 * | 4/2012 | Kirby | E06B 9/78 160/307 |
| 2014/0290875 A1 * | 10/2014 | Chen | E06B 9/307 160/149 |

(Continued)

FOREIGN PATENT DOCUMENTS

| | | |
|---|---|---|
| CN | 214787118 U | 11/2021 |
| CN | 215108647 U | 12/2021 |
| CN | 217354212 U | 9/2022 |

*Primary Examiner* — Beth A Stephan

(57) ABSTRACT

Disclosed are an automatic descending structure for roller shade fabric and a manually operated roller shade. The automatic descending structure for roller shade fabric includes: a roller shade controller for controlling lifting and lowering the roller shade fabric, the roller shade controller includes a roller shade drum and a first housing and a second housing arranged opposite to each other, the roller shade drum is rotatably arranged between the first housing and the second housing and is connected to the roller shade fabric, the roller shade fabric is lifted and lowered by the rotation of the roller shade drum, a first limiting mechanism for limiting an ascending position of the roller shade fabric is arranged on the first housing, so that the roller shade fabric has an ascending limit position; the first limiting mechanism includes a first screw and a first rotating sleeve threadedly sleeved on the first screw.

20 Claims, 18 Drawing Sheets

(56) References Cited

U.S. PATENT DOCUMENTS

| | | | | |
|---|---|---|---|---|
| 2015/0354275 | A1* | 12/2015 | Huang | F16H 31/007<br>160/368.1 |
| 2018/0106107 | A1* | 4/2018 | Smith | E06B 9/32 |
| 2019/0162021 | A1* | 5/2019 | De Vries | E06B 9/42 |
| 2019/0178030 | A1* | 6/2019 | Brown, II | E06B 9/40 |
| 2019/0376340 | A1* | 12/2019 | Smith | E06B 9/88 |
| 2020/0123853 | A1* | 4/2020 | Chen | E06B 9/90 |
| 2022/0090446 | A1* | 3/2022 | Lu | E06B 9/80 |
| 2022/0106835 | A1* | 4/2022 | Francoeur | E06B 9/50 |
| 2022/0356763 | A1* | 11/2022 | Lu | E06B 9/62 |
| 2023/0059350 | A1* | 2/2023 | Lu | E06B 9/60 |
| 2024/0125175 | A1* | 4/2024 | Wang | E06B 9/60 |
| 2024/0218738 | A1* | 7/2024 | Lu | E06B 9/88 |
| 2025/0101800 | A1* | 3/2025 | Wang | E06B 9/17 |

* cited by examiner

AUTOMATIC DESCENDING STRUCTURE OF ROLLER SHADE FABRIC AND MANUALLY OPERATED ROLLER SHADE

CROSS REFERENCE TO RELATED APPLICATIONS

The present application claims the benefit of Chinese Patent Application No. 202421607861.1 filed on Jul. 9, 2024 and 202421444169.1 filed on Jun. 24, 2024. All the above are hereby incorporated by reference in their entirety.

TECHNICAL FIELD

The present disclosure relates to the technical field of curtains, and in particular, to an automatic descending structure for roller shade fabric and a manually operated roller shade.

BACKGROUND

Roller shades are a type of window covering product in which the curtain fabric is processed with resin and rolled into a roller shape. They are operated by pulling a cord or chain to raise or lower the shade, making them simple and convenient to use. A roller shade comprises two oppositely arranged mounting brackets, which secure the shade to the wall. A roller tube is positioned between the two brackets. Since users have varying lighting requirements at different times, it is necessary for the roller shade to be able to stop at any position. Chinese Patent Application No. 202120973189.8 proposes a spring roller shade with a free-stop mechanism, allowing the shade to remain at any desired position and retract as needed. Chinese Patent Application No. 202121033774.6 proposes a spring roller mechanism that enables preloading of force, also allowing the shade to stop at any position and retract. Chinese Patent Application No. 202220225842.7 proposes an automatically descending or ascending roller shade, which operates by the user pulling a cord to raise or lower the shade. When combined with an arbitrary start-stop mechanism or a preloaded spring roller mechanism, it enables the shade to stop at any position and achieve automatic descending or ascending functionality.

In existing roller shades, the user pulls the cord to control the shade's movement. When the shade reaches its highest position, the user must stop pulling the cord to prevent further upward movement. However, in actual use, due to difficulty in precisely controlling the pulling distance or accidental operation, the shade may continue to be pulled even after reaching the highest position. This can cause the fabric to flip over to the other side, rendering the shade unusable and resulting in a poor user experience.

SUMMARY OF THE DISCLOSURE

In order to solve at least one aspect of the above problems, the present disclosure provides an automatic descending structure for roller shade fabric, including: a roller shade controller for controlling lifting and lowering of the roller shade fabric, the roller shade controller including a roller shade drum, a first housing, and a second housing arranged opposite to the first housing, the roller shade drum being rotatably arranged between the first housing and the second housing and connected to the roller shade fabric, and the roller shade fabric being driven to be lifted and lowered by rotation of the roller shade drum, the first housing being provided with a first limiting mechanism for limiting the lifting of the roller shade fabric, so that the roller shade fabric has an ascending limit position; the first limiting mechanism including a first screw and a first rotating sleeve threadedly sleeved on the first screw, the first screw being fixedly connected to the first housing, the first rotating sleeve being connected to the roller shade drum and rotating synchronously with the roller shade drum, and a first limiting piece for limiting the first rotating sleeve being provided on one end of the first screw. The automatic descending structure for roller shade fabric of the present disclosure limits the position of the roller shade fabric by the first limiting mechanism when the fabric rises to the highest position, so that the roller shade fabric cannot be pulled up further, preventing the roller shade fabric from being pulled up excessively and flipped to the other side thus unusable, and enhancing the use experience.

Optionally, the first limiting piece is arranged on an end of the first screw away from the second housing, and the roller shade drum drives the first rotating sleeve to rotate as the roller shade drum rotates to drive the roller shade fabric to rise so that the first rotating sleeve approaches the first limiting piece, and the first rotating sleeve is limited when the first rotating sleeve abuts against the first limiting piece.

Optionally, a first limiting step is provided on a side of the first rotating sleeve close to the first limiting piece, and a first limiting groove corresponding to the first limiting step is provided on the first limiting piece.

Optionally, the first limiting step is one of a plurality of the first limiting steps, and the first limiting groove is one of a plurality of first limiting grooves corresponding to the first limiting steps, the plurality of the first limiting steps are arranged in an annular manner at equal intervals, first guiding bevels are arranged on the first limiting step, and second guiding bevels corresponding to the first guiding bevels are arranged in the first limiting grooves.

Optionally, the first screw is provided with a first external thread for a threaded connection to the first rotating sleeve, and a first pitch-increasing thread is provided at one end of the first external thread close to the first a, and a pitch of the first pitch-increasing thread is greater than a pitch of the first external thread.

Optionally, a second limiting mechanism for limiting a descending position of the roller shade fabric is arranged on the second housing so that the roller shade fabric has a descending limit position, the second limiting mechanism includes a second screw and a second rotating sleeve threadedly sleeved on the second screw, the second screw is fixedly connected to the second housing, the second rotating sleeve is connected to the roller shade drum and rotates synchronously with the roller shade drum, and a second limiting piece for limiting the second rotating sleeve is arranged on one end of the second screw.

Optionally, the second limiting piece is arranged on an end of the second screw away from the first housing, and the roller shade drum drives the second rotating sleeve to rotate as the roller shade drum rotates to drive the roller shade fabric to descend so that the second rotating sleeve approaches the second limiting piece, and the second rotating sleeve is limited when the second rotating sleeve abuts against the second limiting piece. A plurality of second limiting steps are arranged on a side of the second rotating sleeve close to the second limiting piece, second limiting grooves corresponding to the second limiting steps are arranged on the second limiting piece, the plurality of second limiting steps are arranged in an annular manner at equal intervals. Third guiding bevels are arranged on the second limiting steps, and fourth guiding bevels corresponding to the third guiding bevels are arranged in the second limiting groove. A second external thread for a threaded connection with the second rotating sleeve is arranged on the second screw, and a second pitch-increasing thread is arranged on an end of the second external thread close to the second limiting piece, and a pitch of the second pitch-increasing thread is greater than a pitch of the second external thread.

Optionally, the first screw, the second screw and the roller shade drum are coaxially arranged, when the roller shade drum rotates to drive the roller shade fabric to rise, the first rotating sleeve and the second rotating sleeve both move towards the first limiting piece, and when the roller shade drum rotates to drive the roller shade fabric to descend, the first rotating sleeve and the second rotating sleeve both move towards the second limiting piece.

Optionally, the second housing is provided with a locking and releasing mechanism for locking/releasing a height of the roller shade fabric. When the roller shade fabric rises to a desired height, the roller shade fabric is locked by the locking and releasing mechanism, and when the roller shade fabric needs to be lowered, the roller shade fabric is released by the locking and releasing mechanism so as to be lowered under its own gravity. The locking and releasing mechanism includes a fixed shaft fixedly connected to the second housing, an end of the fixed shaft away from the second housing is fixedly connected to the second screw. A rotating base for connecting to the roller shade drum is rotatably sleeved on the fixed shaft, and the rotating base rotates synchronously with the roller shade drum. A sliding groove member and a torsion spring are rotatably sleeved on the fixed shaft, and an end of the torsion spring is connected to the sliding groove member. The sliding groove member is able to unidirectionally rotate through the torsion spring, and a rotation direction of the sliding groove member is the same as a rotation direction of the roller shade drum when the roller shade fabric rises. Two positioning beads are arranged between the rotating base and the sliding groove member, and the rotating base is provided with a horizontal sliding groove for the positioning beads to slide horizontally. The two positioning beads are distributed at 90 degrees about an axis of the sliding groove member as a rotation center. The sliding groove member is provided with a first sliding track and a second sliding track communicated with each other. When the locking and releasing mechanism is locked, one of the positioning beads slides to a first positioning part of the first sliding track. When the roller shade fabric rises, one of the positioning beads slides to a second positioning part of the first sliding track. When the locking and releasing mechanism is released, both of the positioning beads slide into the second sliding track.

Optionally, a pull handle is provided on the first housing for driving the roller shade drum to rotate and the roller shade fabric to rise, a speed reducer is connected to an end of the first screw away from the first housing, and the second housing includes a rotation adjusting plate for adjusting a height of the descending limit position of the roller shade fabric, and the rotation adjusting plate is fixedly connected to the fixed shaft.

Compared with the existing technology, the automatic descending structure for roller shade fabric of the present disclosure limits the position of the roller shade fabric by the first limiting mechanism when the roller shade fabric rises to the highest position, prevent further rising of the roller shade fabric, thereby avoiding the roller shade fabric from being excessively pulled up and flipping to the other side which would result in inoperability. A first pitch-increasing thread is provided at one end of the first external thread close to the first limiting piece, and the pitch of the first pitch-increasing thread is greater than the pitch of the first external thread, so that when the first rotating sleeve rotates to the first pitch-increasing thread, the speed at which the first rotating sleeve approaches the first limiting piece is increased, that is, an axial displacement of the first rotating sleeve screwed along the first pitch-increasing thread becomes greater under the same rotation angle. This facilitates the first limiting steps of the first rotating sleeve to be quickly and accurately engaged with the first limiting groove for limiting and achieves a reliable structure. The first limiting mechanism and the second limiting mechanism enable the roller shade to be limited at the highest position and the lowest position. When the roller shade fabric rises to the desired height, the roller shade fabric is locked by means of the locking and releasing mechanism; when the roller shade fabric needs to be lowered, the roller shade fabric is released by the locking and releasing mechanism, so that the roller shade fabric descends under its own gravity. This allows an easy operation so that the user can stop the roller shade at the desired height. Two positioning beads distributed at 90 degrees are provided, so that the positioning beads are able to slide from the first positioning part to the second positioning part with the rotating base circumferentially rotating by only ¼ circle. This enables the roller shade fabric to rise with just a short pull of the cord or the pull handle and suspend with releasing of the cord or the pull handle after the short pull, providing a good user experience.

The present disclosure further provides a manually operated roller shade, including the above-mentioned automatic descending structure for roller shade fabric. The manually operated roller shade also has the above-mentioned beneficial effects of the automatic descending structure for roller shade fabric, which will not be repeated herein.

Optionally, the above-mentioned manually operated roller shade includes a pull rod, a pull cord for driving the roller shade drum to rotate circumferentially is arranged on the first housing, one end of the pull cord serves as an external force pulling end. The pull rod includes an outer rod and an inner rod slidably sleeved inside the outer rod, and the external force pulling end is connected to the outer rod. A connecting sleeve is arranged inside the inner rod, a first wire hole corresponding to the pull cord is formed on an inner side of the connecting sleeve, and a cord body is connected between the connecting sleeve and the first housing. An elastic member is arranged between the inner rod and the connecting sleeve, and an upper end of the inner rod is pressed against the first housing by an elastic force of the elastic member.

Optionally, a universal connection part is provided between the upper end of the inner rod and the first housing, and the universal connection part includes an arc-shaped portion provided on the upper end of the inner rod and an arc-shaped notch provided on the first housing, and the arc-shaped portion corresponds to the arc-shaped notch. An end cover is fixedly arranged on the upper end of the inner rod, an end of the elastic member abuts against a bottom portion of the end cover, and another end of the elastic member abuts against an upper side of the connecting sleeve. A second wire hole for passing the pull cord and the cord body is provided on the end cover, and the end cover is threadedly connected and fixed to the upper end of the inner rod.

Optionally, the elastic member is a compression spring, the pull cord and the cord body pass through an inner diameter hole of the elastic member, a first limiting part is provided on an upper part of the cord body, and a first holding recess for engaging with and limiting the first limiting part is provided on the first housing.

Optionally, the cord body includes a first cord body and a second cord body, a first connecting part is formed between a lower part of the first cord body and the connecting sleeve, a second connecting part is formed between a lower part of the second cord body and the connecting sleeve, and the first connecting part and the second connecting part are symmetrically distributed on the connecting sleeve. A shock-absorbing soft sleeve is provided on an outer wall of the upper end of the inner rod, and an upper end of the outer rod abuts against a lower side of the shock-absorbing soft sleeve in a normal state.

Optionally, a pull handle is fixedly arranged at a bottom part of the outer rod, a second limiting part is provided at the external force pulling end, and a second holding recess for limiting the second limiting part is provided on the pull handle. A rotating disk and a coil spring for driving the rotating disk to reverse and reset are provided on the first housing, the rotating disk is connected to the roller shade drum and rotates synchronously. The pull cord is wound in an annular groove of the rotating disk, and an end of the pull cord away from the external force pulling end is engaged in a third holding recess of the rotating disk. Two guiding posts are symmetrically arranged on the first housing, a rotating wheel is rotatably sleeved on one of the guiding posts. The pull cord is pressed against the rotating wheel, and the rotating wheel is driven to rotate by the pull cord.

Optionally, the outer rod includes a first outer rod and a second outer rod connected to a lower part of the first outer rod, a first connecting column is provided on an inner side of the lower part of the first outer rod, a second connecting column is arranged on an inner side of an upper part of the second outer rod, and the first connecting column is threadedly connected to the second connecting column.

Optionally, a fourth holding recess is provided on the first connecting column, a second limiting part is provided on the external force pulling end, and the second limiting part is engaged with the fourth holding recess.

Optionally, an externally threaded column is provided in a lower part of the first connecting column, and an internally threaded tube threadedly connected to the externally threaded column is provided in an upper part of the second connecting column. A first plug-in part for plugging in the first outer rod is provided on an upper part of the first connecting column, and a first bolt is connected to a lower end of the first plug-in part for expanding the first plug-in part, and the externally threaded column is provided with an avoidance slot for avoiding the first bolt. A protruding rib is provided on the first plug-in part for tight fitting against an inner wall of the first outer rod. A second plug-in part for plugging in the second outer rod is provided on a lower part of the second connecting column, a second bolt is connected to the second plug-in part for expanding the second plug-in part, and the second plug-in part after being expanded is tightly fitted and fixed to an inner wall of the second outer rod. A plurality of first annular protrusions are arranged on an outer side wall of the second plug-in part in a vertical direction, and when the second bolt is rotated and inserted into the second plug-in part, the first annular protrusions expand outwardly and are pressed against and fixed with the inner wall of the second outer rod.

Optionally, the pull handle is sleeved on an outer side of a lower part of the second outer rod, and an expansion column is provided on an inner side of the lower part of the second outer rod. A third bolt is connected to the expansion column for expanding the expansion column. The expansion column expands so that the lower part of the second outer rod expands. A plurality of second annular protrusions are arranged on an outer wall of the expansion column in a vertical direction. When the third bolt is rotated and inserted into the expansion column, the second annular protrusions expand outwardly and drive the lower part of the second outer rod to expand. The lower part of the second outer rod after being expanded is tightly fitted and fixed with the pull handle, and a mounting through hole corresponding to the third bolt is provided in a lower part of the pull handle.

Figure 1:
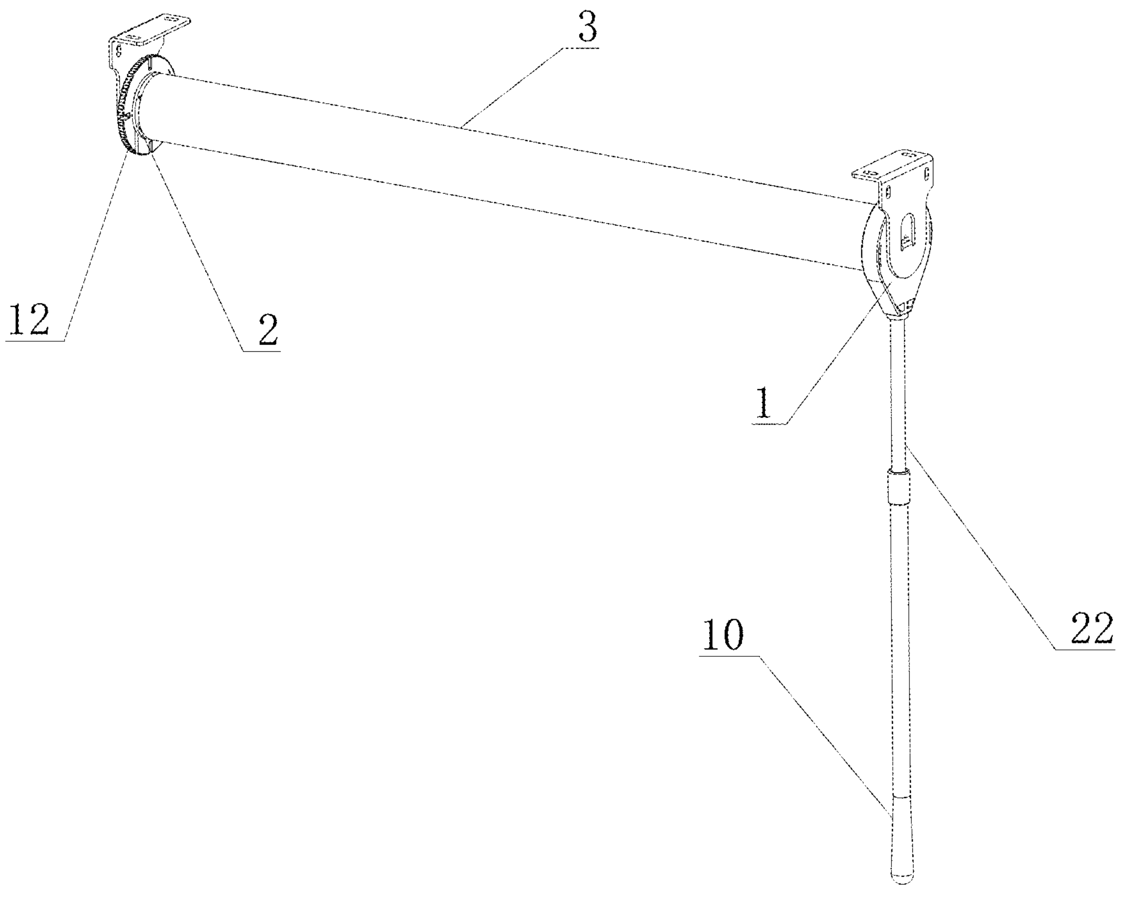
FIG. 1 is a schematic structural diagram of an automatic descending structure for roller shade fabric according to the present disclosure.

Reference numerals in the figures are as follows: 1 first housing, 100 threaded structure, 2 second housing, 3 roller shade drum, 4 first screw, 41 first limiting piece, 411 first limiting groove, 412 second guiding bevel, 42 first external thread, 421 first pitch-increasing thread, 5 first rotating sleeve, 51 first limiting step, 511 first guiding bevel, 6 second screw, 61 second limiting piece, 611 second limiting groove, 62 second external thread, 621 second pitch-increasing thread, 7 second rotating sleeve, 71 second limiting step, 711 third guiding bevel, 8 fixed shaft, 81 rotating base, 811 horizontal sliding groove, 82 sliding groove member, 821 first sliding track, 8211 first positioning part, 8212 second positioning part, 822 second sliding track, 83 torsion spring, 9 positioning bead, 10 pull handle, 11 speed reducer, 12 rotation adjusting plate, 13 plug-in square shaft, 14 square hole, 15 inclined guide block, 16 guiding slot, 17 limit groove, 2101 arc-shaped notch, 2102 first holding recess, 22 pull rod, 24 pull cord, 241 external force pulling end, 2411 second limiting part, 25 outer rod, 26 inner rod, 261 arc-shaped portion, 262 end cover, 2621 second wire hole, 263 shock-absorbing soft sleeve, 27 connecting sleeve, 2701 first wire hole, 271 first connecting part, 272 second connecting part, 28 cord body, 2801 first limiting part, 281 first cord body, 282 second cord body, 29 elastic member, 211 second holding recess, 212 rotating disk, 2121 annular groove, 2122 third holding recess, 213 coil spring, 214 guiding post, 215 rotating wheel, 251 first outer rod, 252 second outer rod, 253 first connecting column, 2531 externally threaded column, 2532 avoidance slot, 254 second connecting column, 2541 internally threaded tube, 255 fourth holding recess, 256 first plug-in part, 2561 protruding rib, 2562 strip protruding rib, 2563 arc protruding rib, 257 first bolt, 258 second plug-in part, 2581 first annular protrusion, 259 second bolt, 260 expansion column, 2601 second annular protrusion, 2602 third bolt, and 2603 mounting through hole.

DETAILED DESCRIPTION OF EMBODIMENTS

In order to make the above-mentioned objects, features and advantages of the present disclosure clearer and easy to understand, specific embodiments of the present disclosure are described in detail below with reference to the accompanying drawings.

In the description of the present disclosure, it should be understood that the orientation or position relationship indicated by the terms "upper", "lower" and the like is based on the orientation or position relationship in the normal operation of the product.

The terms "first" and "second" are used for descriptive purposes only and should not be understood as indicating or implying relative importance or implicitly indicating the number of the indicated technical features. Therefore, the features defined as "first" and "second" may explicitly or implicitly include at least one of the features.

First Embodiment

Referring to FIGS. 1 to 17, a first embodiment of the present disclosure provides an automatic descending structure for a roller shade fabric, including: a roller shade controller for controlling the lifting and lowering of the roller shade fabric. The roller shade controller includes a roller shade drum 3, a first housing 1 and a second housing 2 arranged opposite to the first housing 1. The roller shade drum 3 is rotatably arranged between the first housing 1 and the second housing 2, and the roller shade drum 3 is fixedly connected to an upper end of the roller shade fabric, so that the roller shade fabric is lifted and lowered by the rotation of the roller shade drum 3. The first housing 1 is provided with a first limiting mechanism for limiting an ascending position of the roller shade fabric, so that the roller shade fabric has an ascending limit position. The first limiting mechanism includes a first screw 4 and a first rotating sleeve 5 threadedly sleeved on the first screw 4, and the first rotating sleeve 5 rotates to move along an axial direction of the first screw 4. The first screw 4 is fixedly connected to the first housing 1, and the first rotating sleeve 5 is connected to the roller shade drum 3 and rotates synchronously with the roller shade drum 3. One end of the first screw 4 is provided with a first limiting piece 41 for limiting the first rotating sleeve 5. When the roller shade is raised, the first rotating sleeve 5 rotates and moves towards the first limiting piece 41. When the roller shade is raised to the highest position, the first rotating sleeve 5 abuts against and is limited by the first limiting piece 41, so that the roller shade cannot continue to rise, allowing a reliable operation. In the automatic descending structure for roller shade fabric of the present disclosure, the roller shade fabric is limited by the first limiting mechanism when the roller shade fabric rises to the highest position, so that the roller shade fabric cannot be pulled up further. This avoids excessive lifting that could cause the fabric to flip to the other side and become unusable, ensuring a better user experience.

Figure 2:
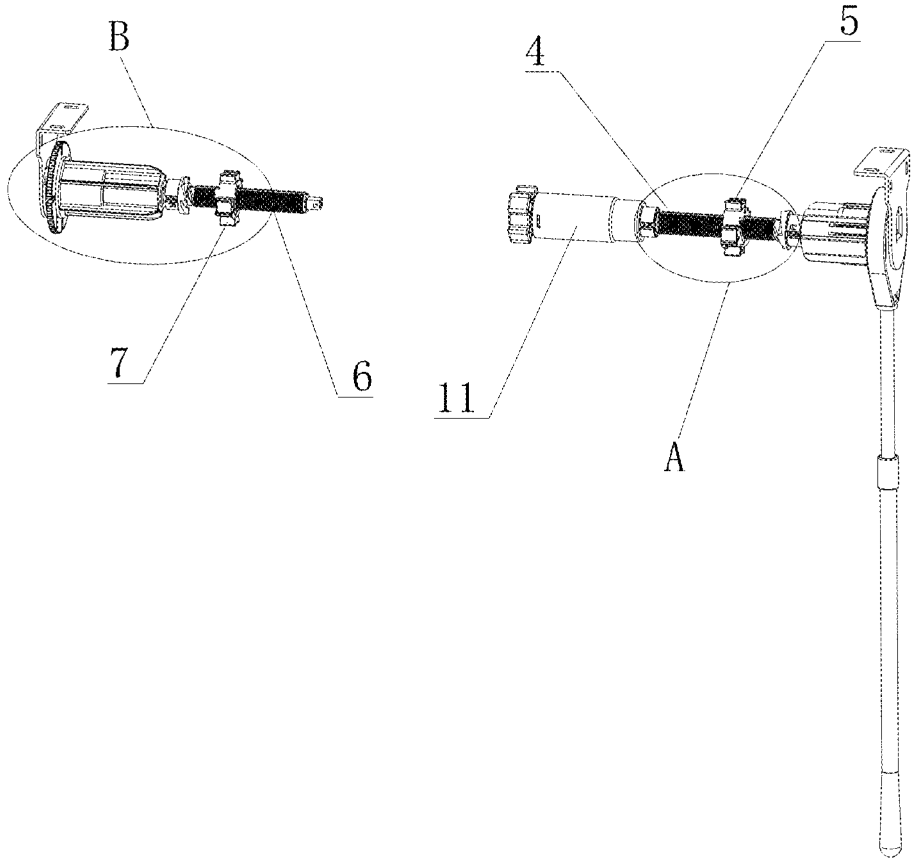
FIG. 2 is a schematic diagram of an interior structure of a roller shade drum of the automatic descending structure for roller shade fabric according to the present disclosure.
Figure 3:
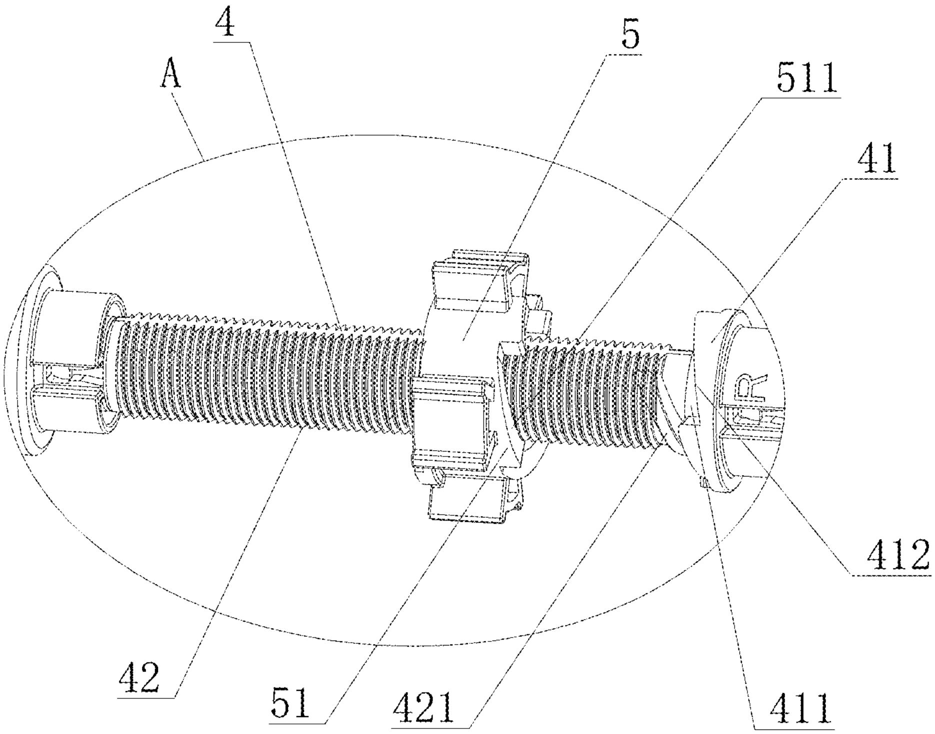
FIG. 3 is an enlarged view of area A in FIG. 2.
Figure 4:
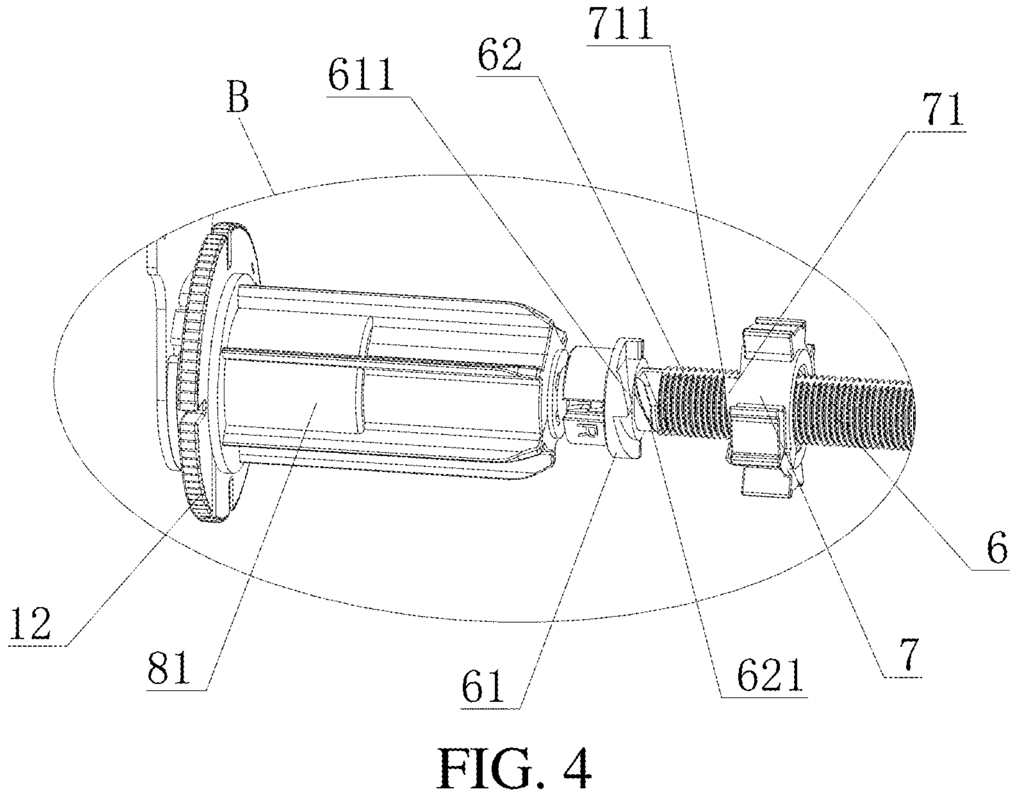
FIG. 4 is an enlarged view of area B in FIG. 2.
Figure 5:
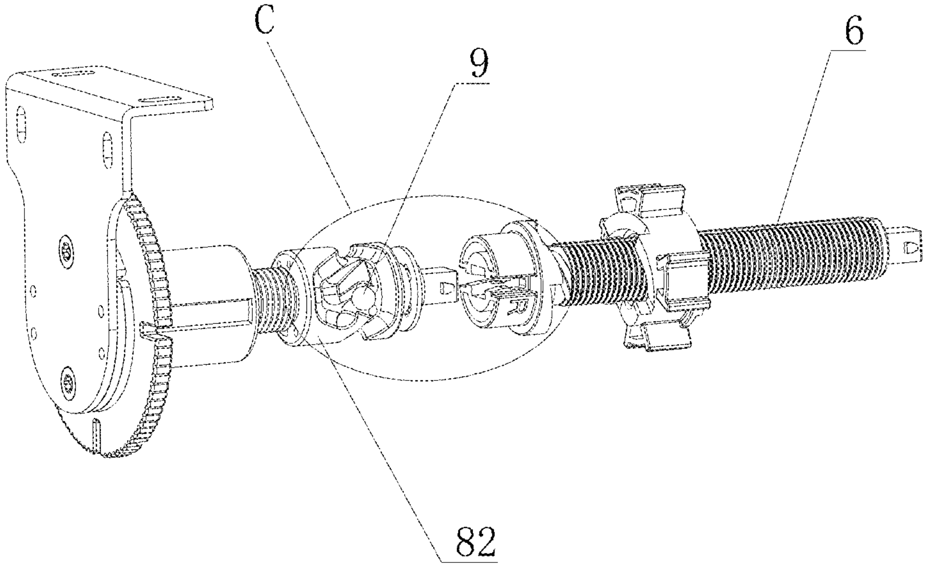
FIG. 5 is a schematic structural diagram of a sliding groove member of the automatic descending structure for roller shade fabric according to the present disclosure.
Figure 6:
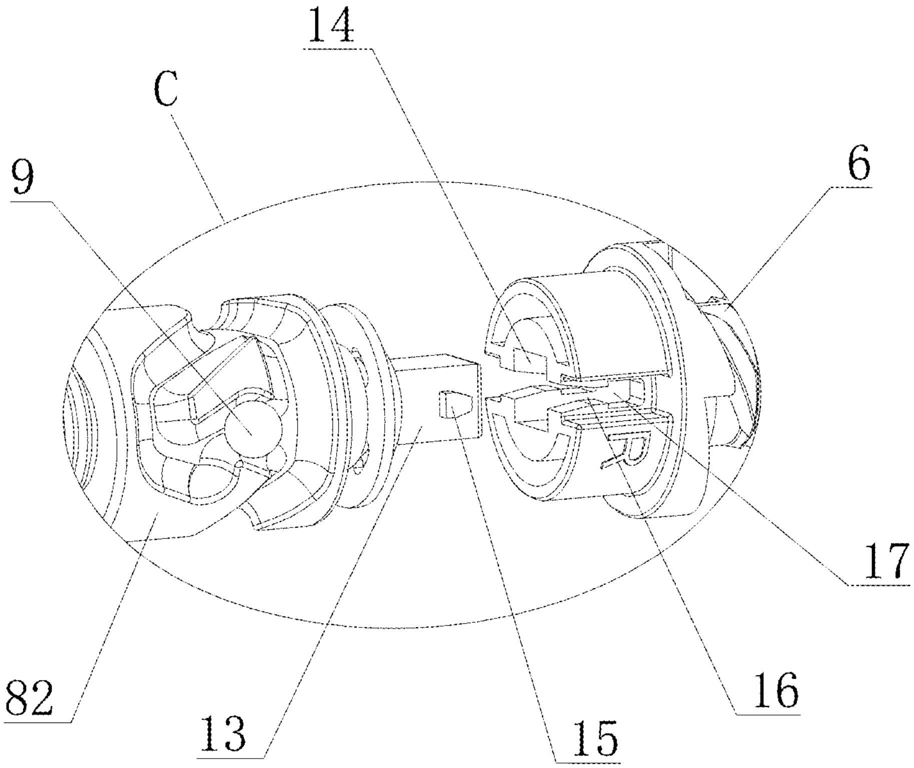
FIG. 6 is an enlarged view of area C in FIG. 5.
Figure 7:
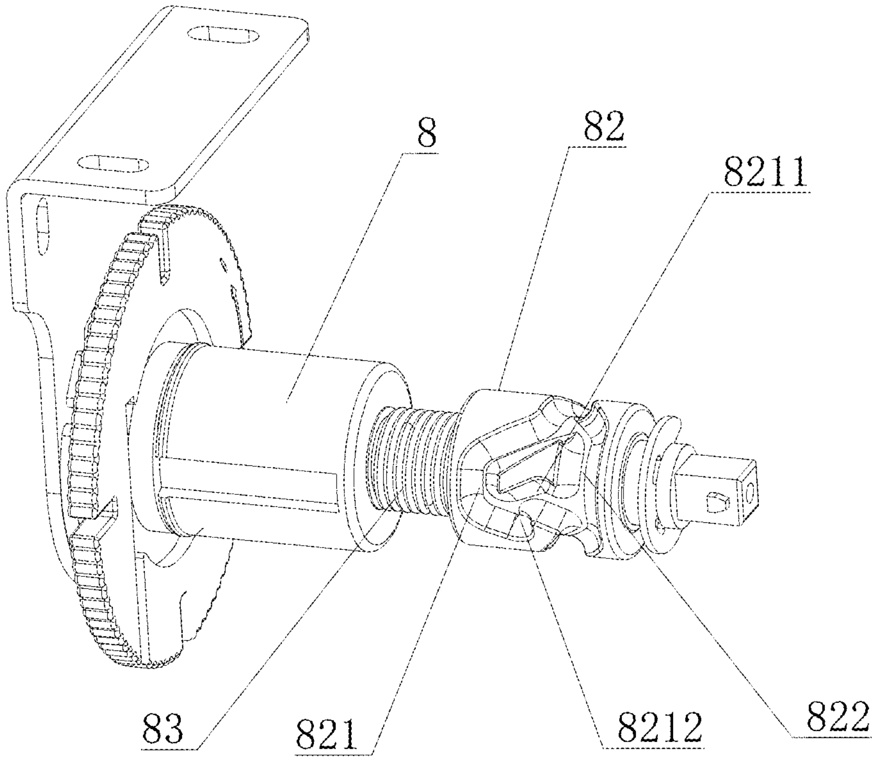
FIG. 7 is a schematic structural diagram of a torsion spring portion of the automatic descending structure for roller shade fabric according to the present disclosure.
Figure 8:
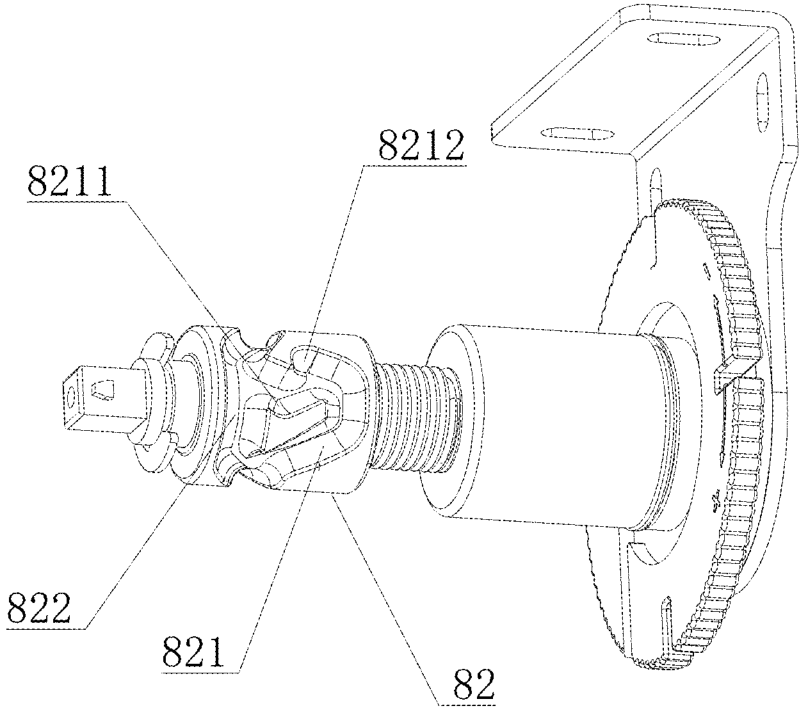
FIG. 8 is a schematic structural diagram of the first sliding track and the second sliding track of the automatic descending structure for roller shade fabric according to the present disclosure.
Figure 9:
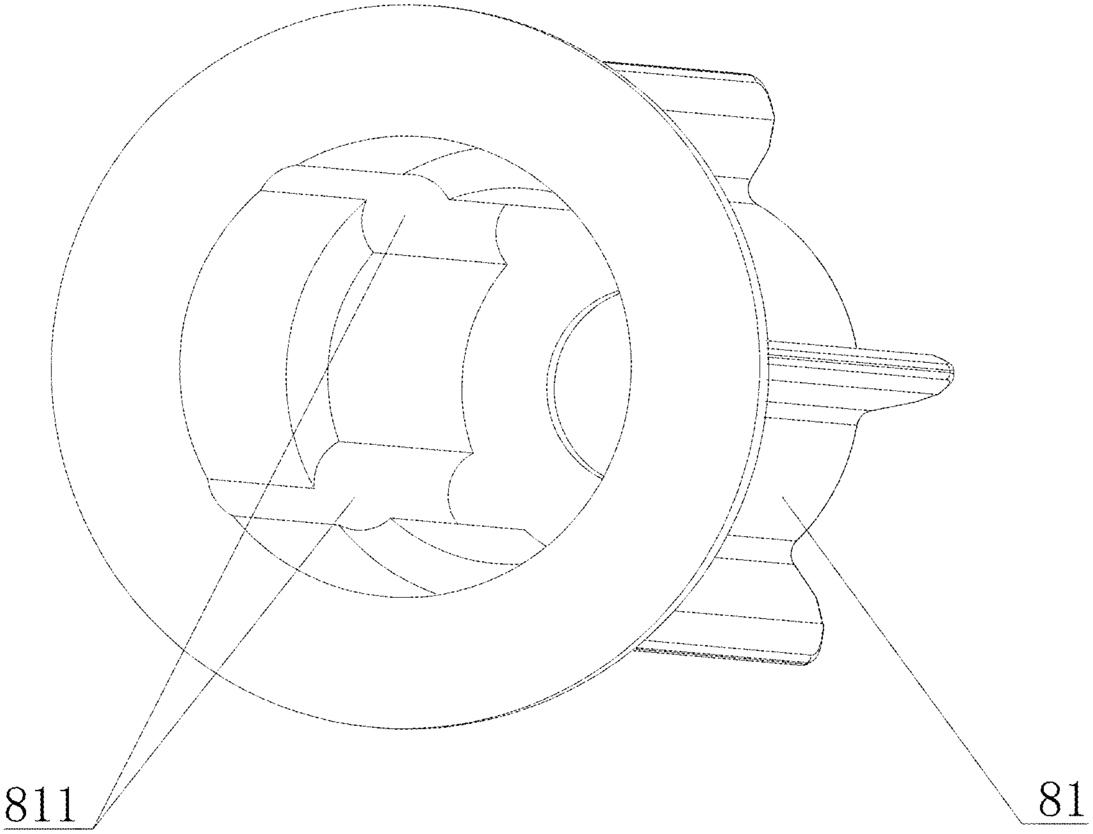
FIG. 9 is a schematic structural diagram of a rotating base of the automatic descending structure for roller shade fabric according to the present disclosure.
Figure 10:
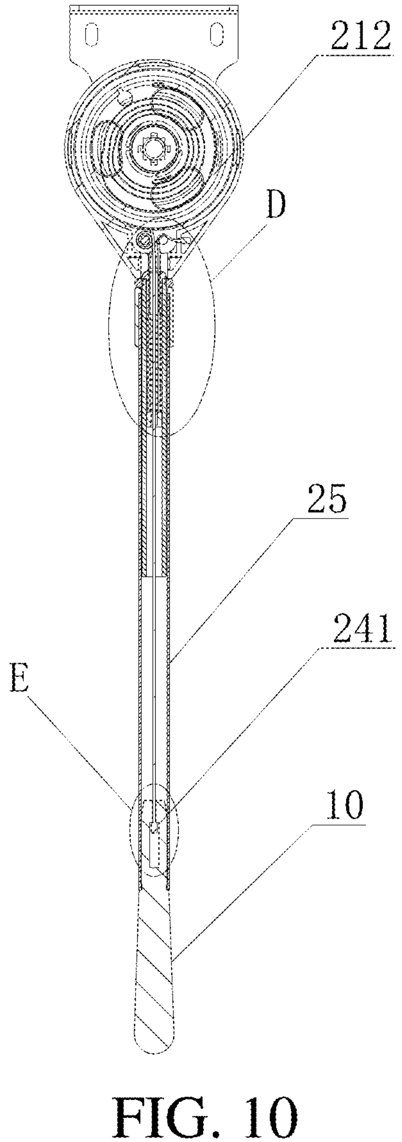
FIG. 10 is a cross-sectional view of a manually operated roller shade according to the present disclosure in a normal state.
Figure 11:
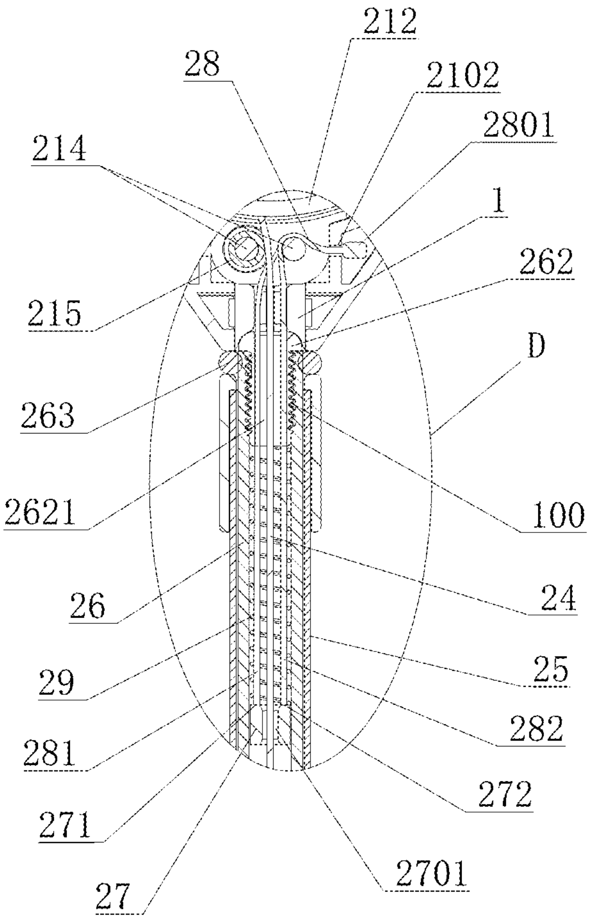
FIG. 11 is an enlarged view of area D in FIG. 10.
Figure 12:
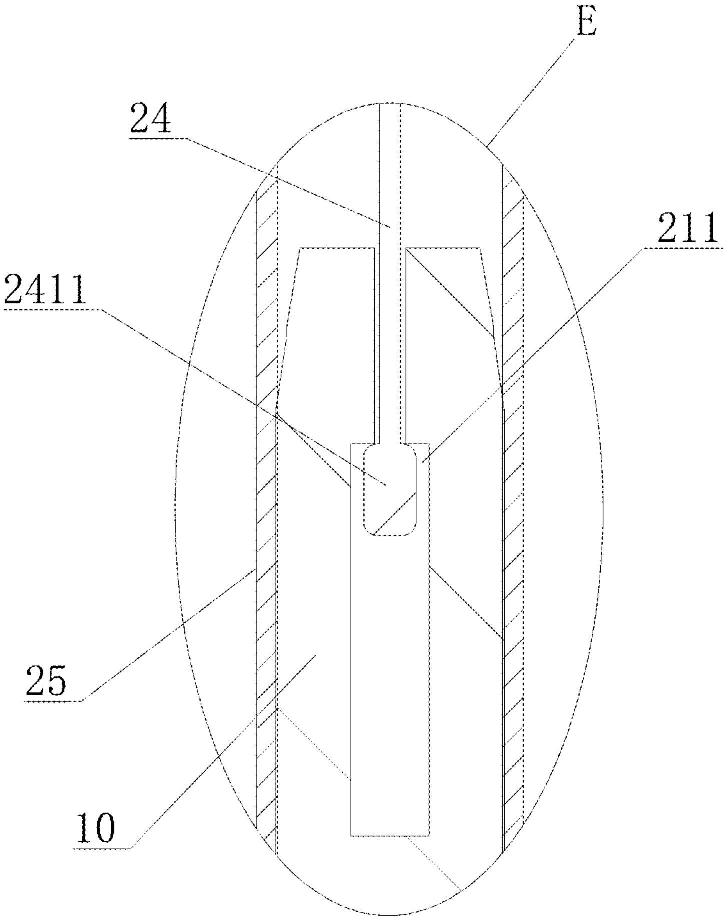
FIG. 12 is an enlarged view of area E in FIG. 10.
Figure 13:
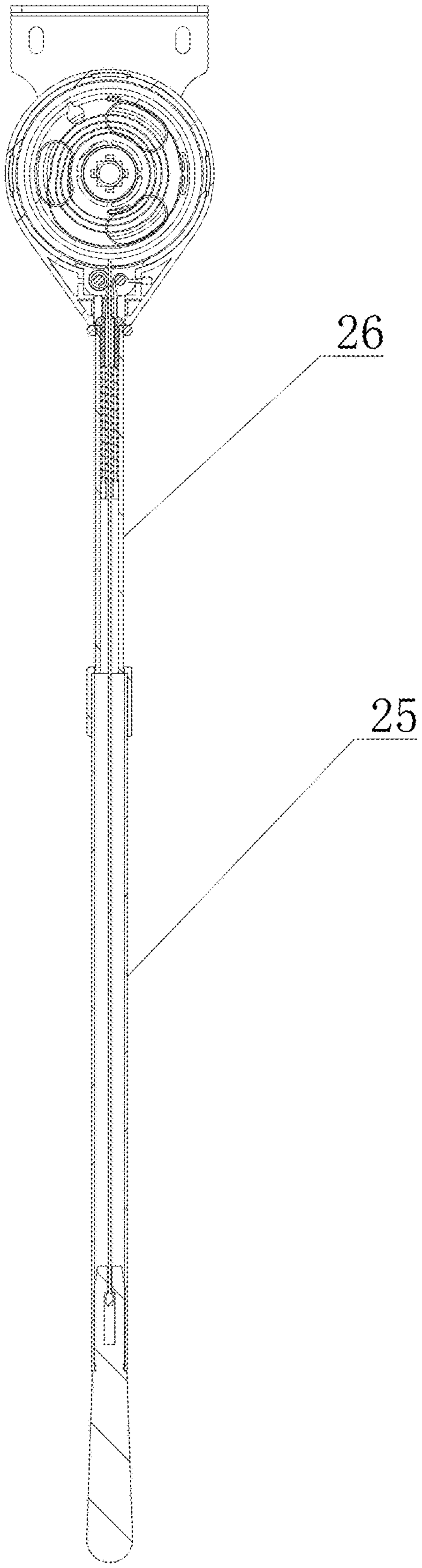
FIG. 13 is a cross-sectional view of the manually operated roller shade according to the present disclosure when an outer rod is pulled down.
Figure 14:
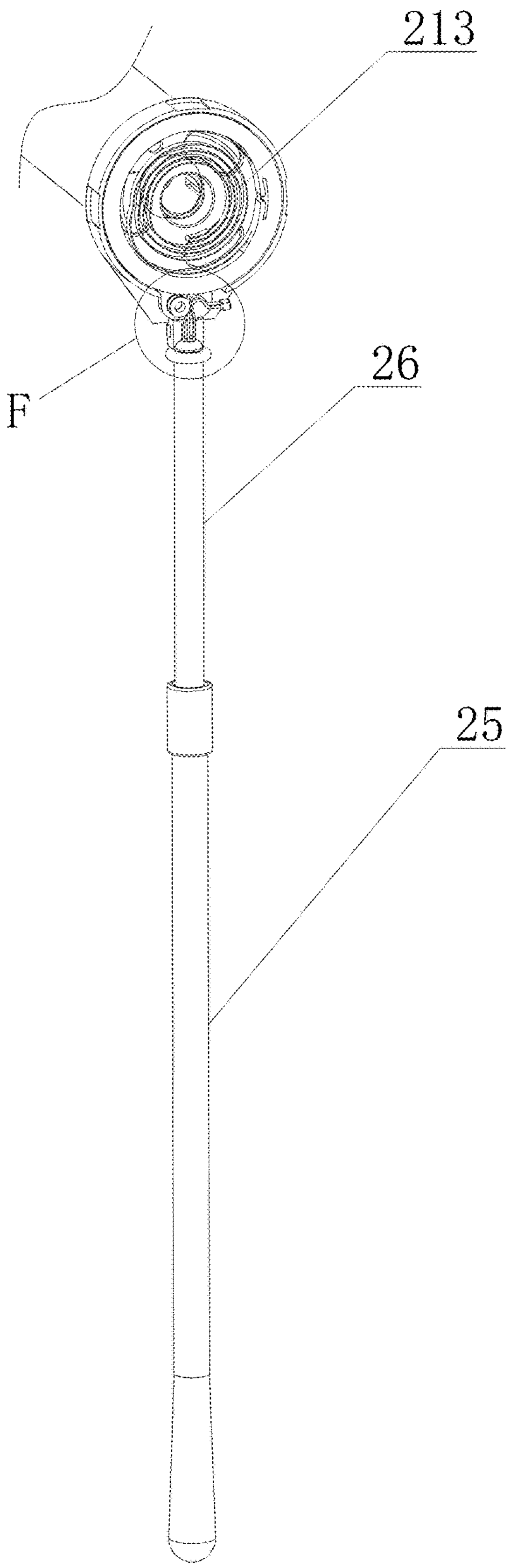
FIG. 14 is a schematic structural diagram of the manually operated roller shade according to the present disclosure when the outer rod is pulled down.
Figure 15:
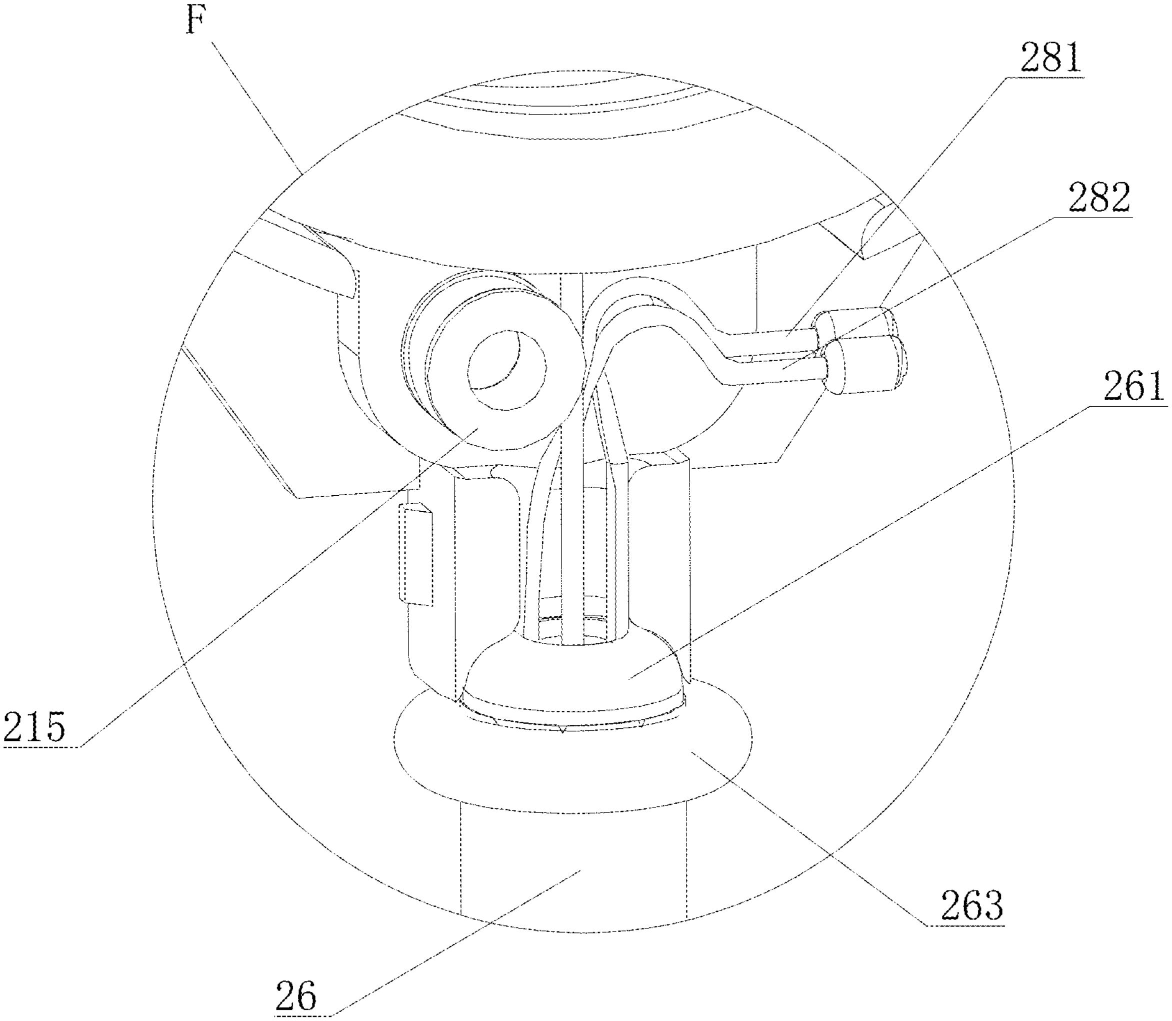
FIG. 15 is an enlarged view of area F in FIG. 14.
Figure 16:
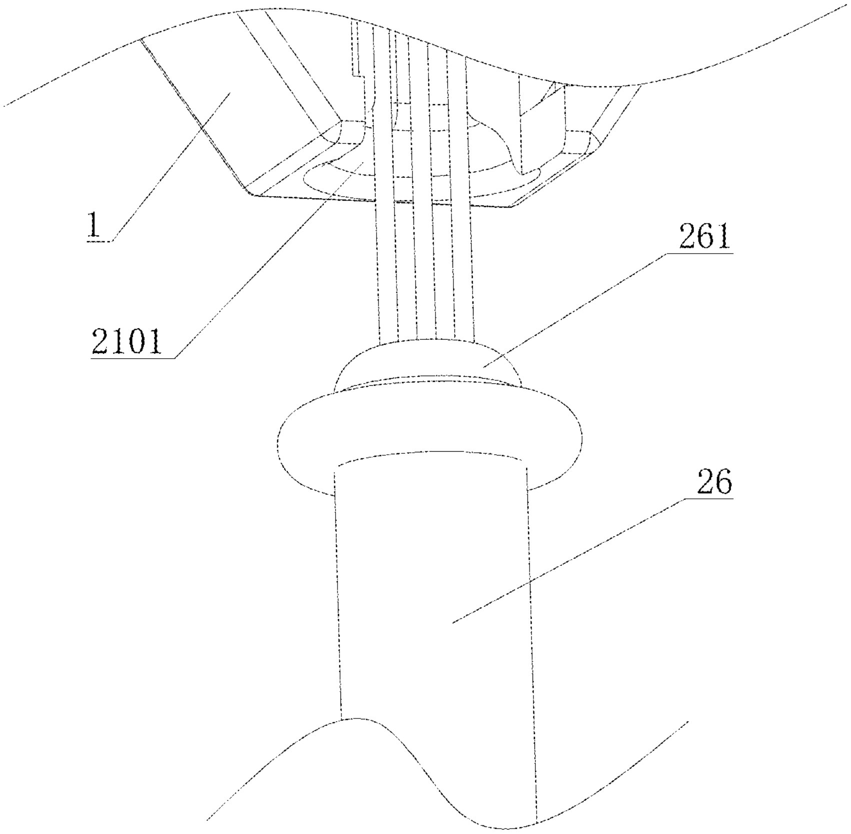
FIG. 16 is a schematic structural diagram of an arc-shaped portion of the manually operated roller shade according to the present disclosure.
Figure 17:
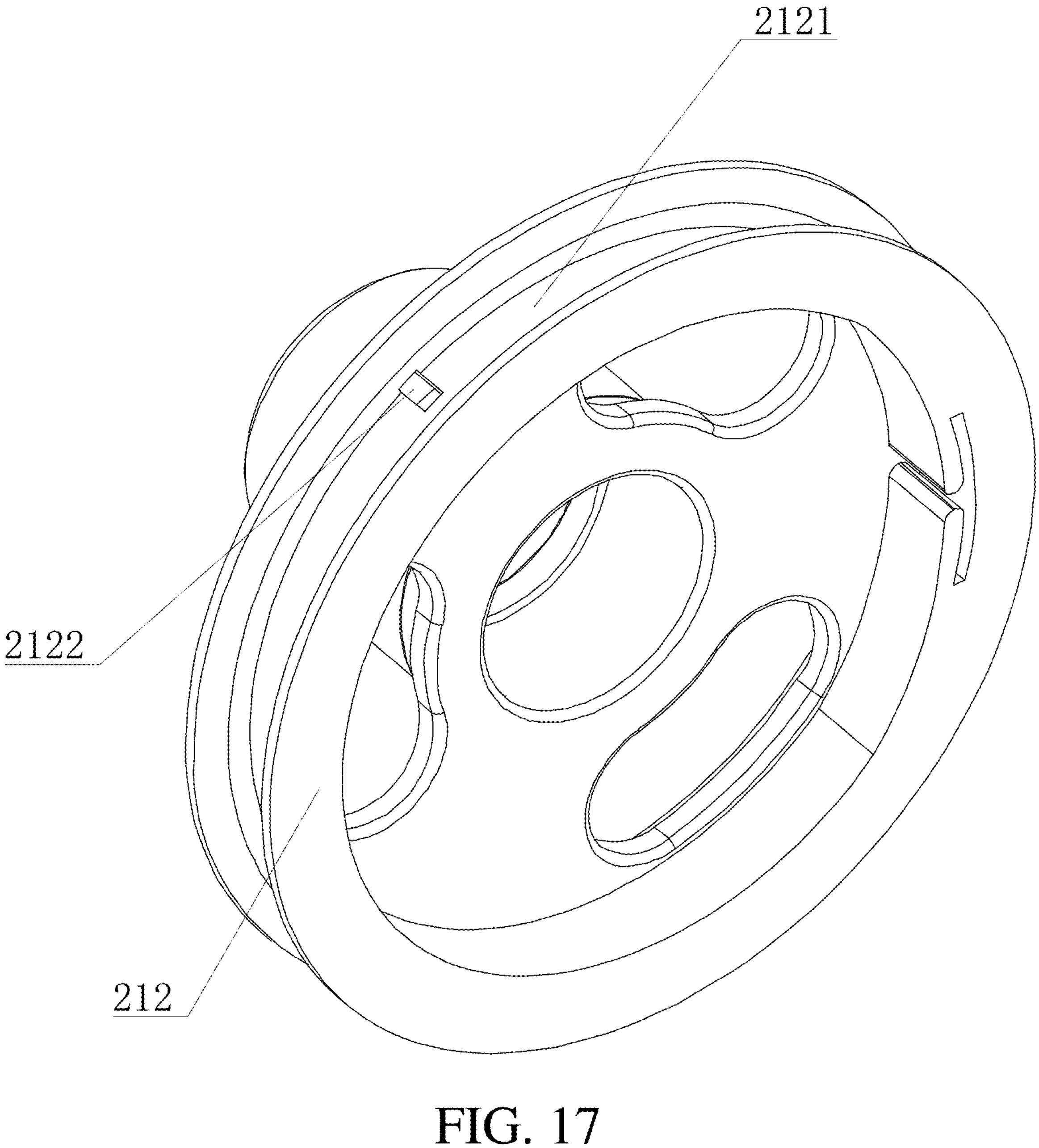
FIG. 17 is a schematic structural diagram of a rotating disk of the manually operated roller shade according to the present disclosure.
Figure 18:
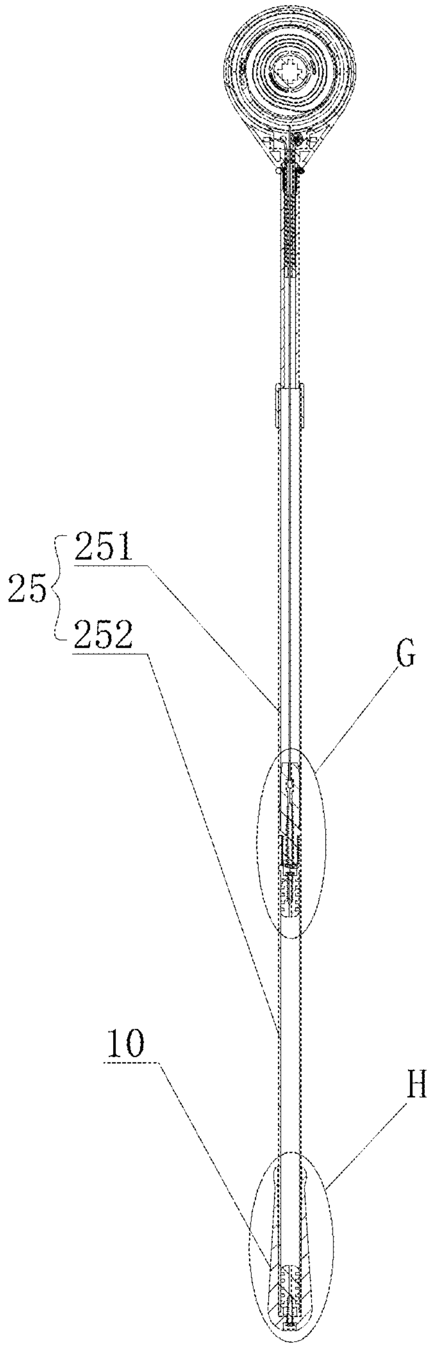
FIG. 18 is a cross-sectional view of a second embodiment according to the present disclosure.
Figure 19:
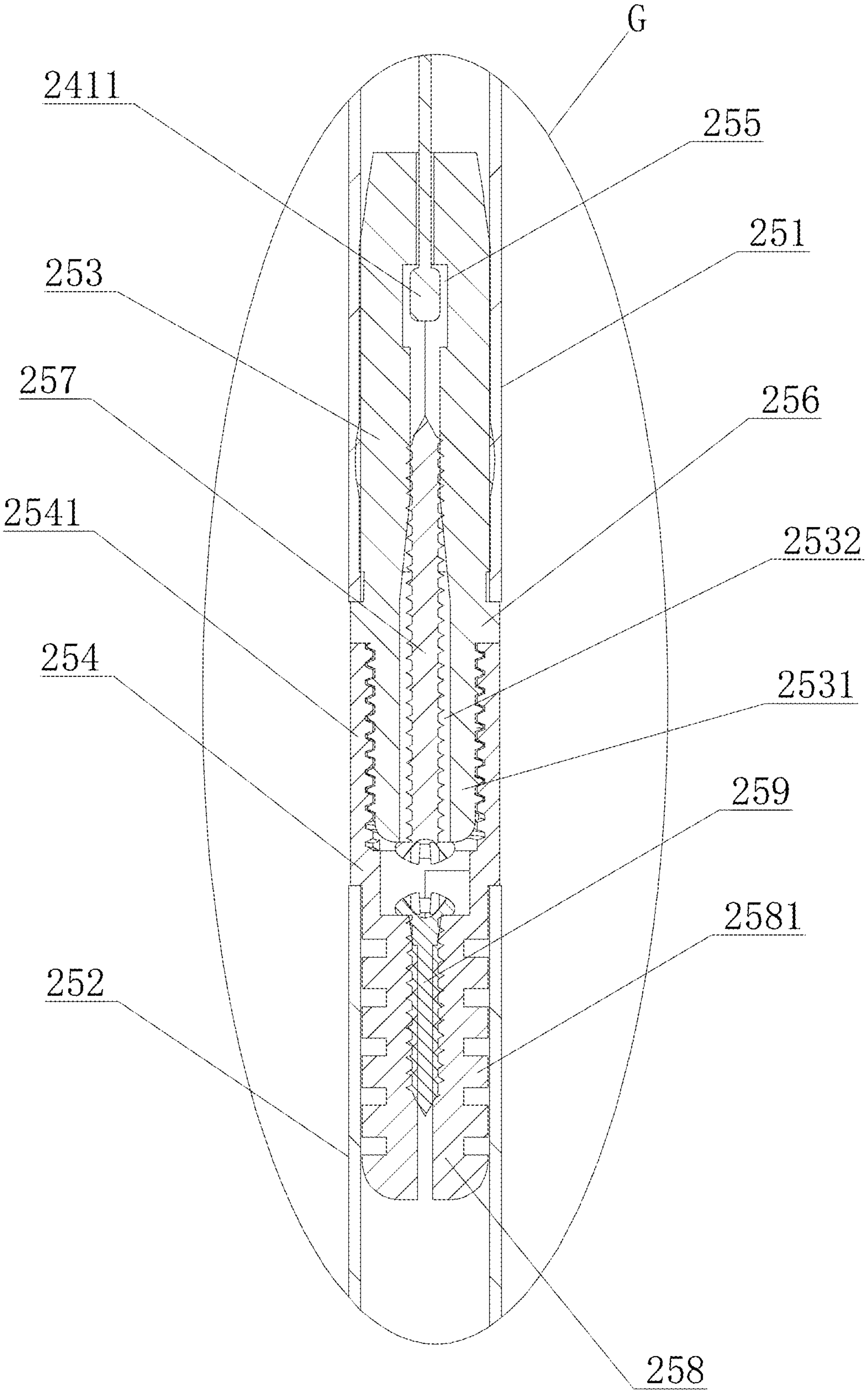
FIG. 19 is an enlarged view of area G in FIG. 18.
Figure 20:
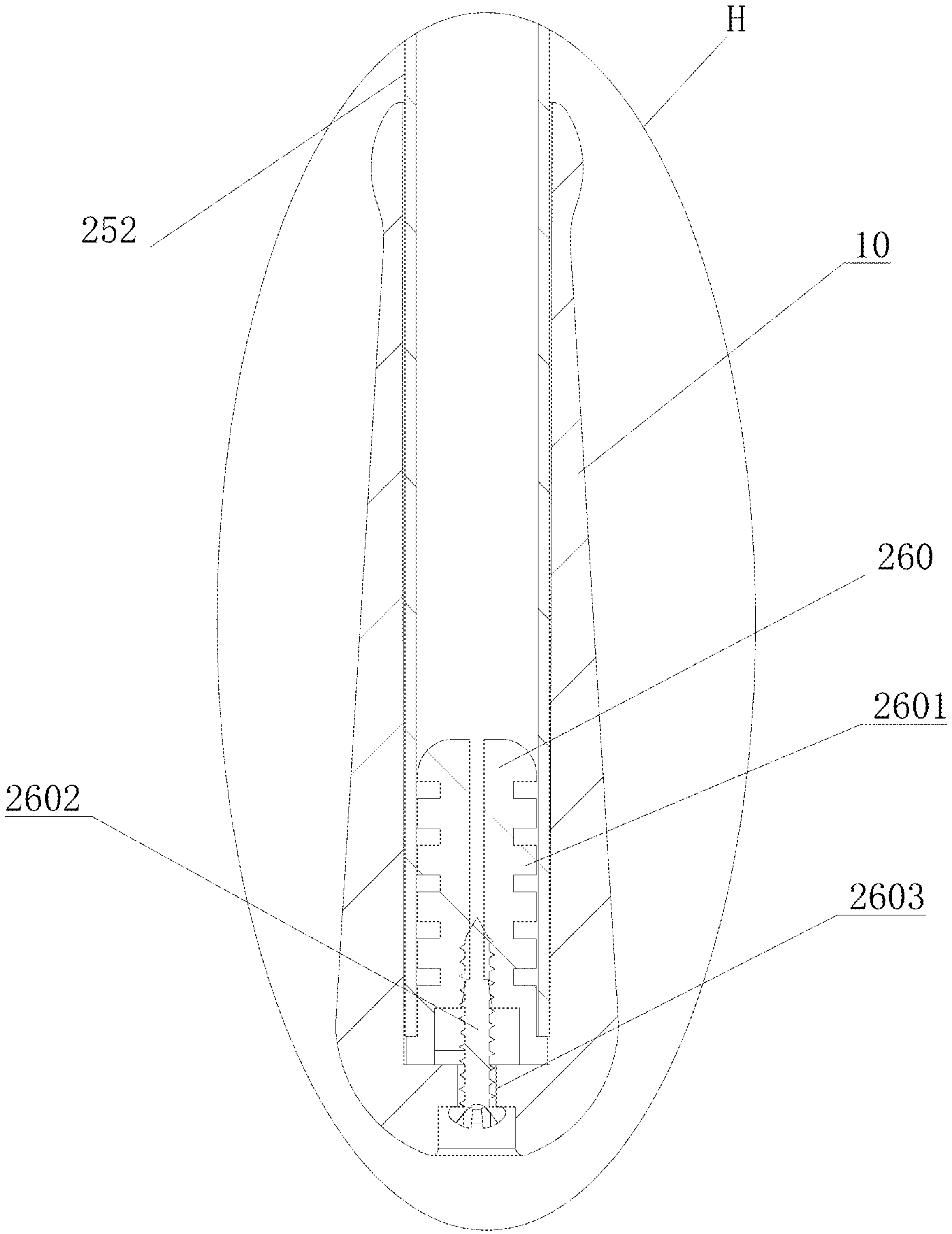
FIG. 20 is an enlarged view of area H in FIG. 18.
Figure 21:
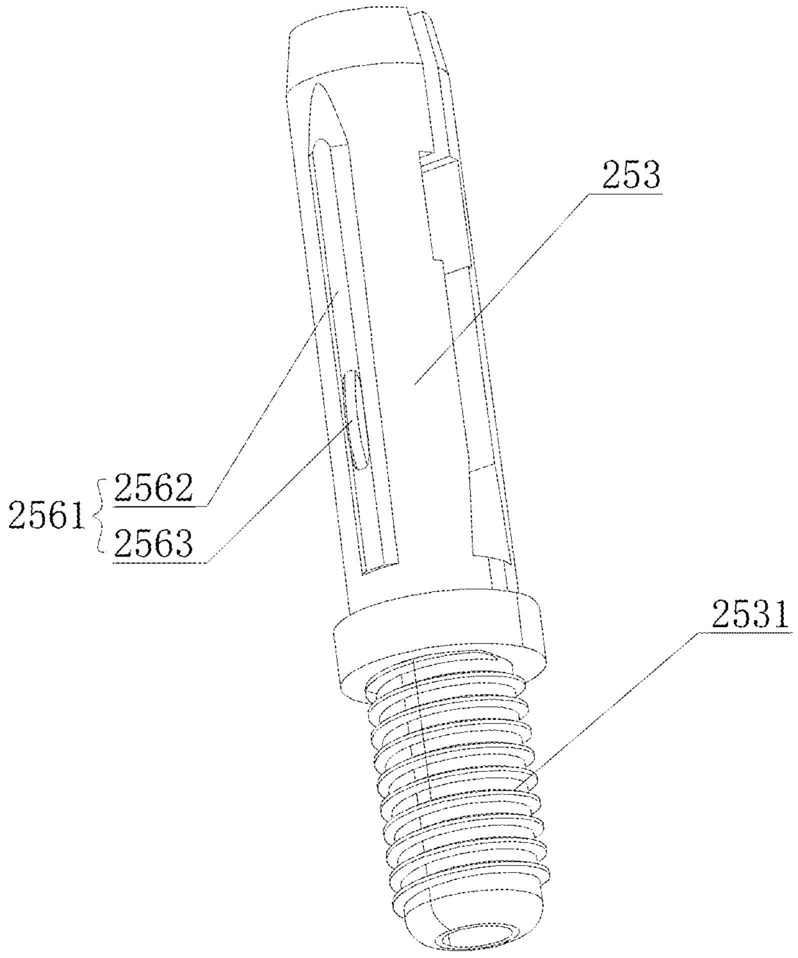
FIG. 21 is a schematic structural diagram of a first connecting column in the second embodiment of the manually operated roller shade according to the present disclosure.

Referring to FIGS. 1 to 3, the first limiting piece 41 is arranged on an end of the first screw 4 away from the second housing 2. The roller shade drum 3 drives the first rotating sleeve 5 to rotate when the roller shade drum 3 is rotated to drive the roller shade fabric to rise, so that the first rotating sleeve 5 moves towards the first limiting piece 41, and the first rotating sleeve 5 is limited when abutting against the first limiting piece 41, realizing a reasonable structural design. A first limiting step 51 is arranged on a side of the first rotating sleeve 5 close to the first limiting piece 41, and a first limiting groove 411 matching the first limiting step 51 is arranged on the first limiting piece 41; when the first rotating sleeve 5 abuts against the first limiting piece 41 to be limited, the first limiting step 51 is correspondingly engaged with the first limiting groove 411 for limiting, producing a good limiting effect. A plurality of first limiting steps 51 may be arranged in an annular shape with equal intervals, and first guiding bevels 511 are arranged on the first limiting steps 51. Second guiding bevels 412 corresponding to the first guiding bevels 511 are provided on limiting grooves 411, so that the first limiting steps 51 are able to be screwed into the first limiting grooves 411 for limiting. The first screw 4 is provided with a first external thread 42 for a threaded connection with the first rotating sleeve 5, and the first external thread 42 is provided with a first pitch-increasing thread 421 at an end close to the first limiting piece 41. The pitch of the first pitch-increasing thread 421 is greater than the pitch of the first external thread 42, so that when the first rotating sleeve 5 is rotated and reaches the first pitch-increasing thread 421, the speed at which the first rotating sleeve 5 approaches the first limiting piece 41 is increased, that is, when the first rotating sleeve 5 is rotated by the same angle, an axial displacement of the first rotating sleeve 5 screwed in along the first pitch-increasing thread 421 is greater, so that the first limiting steps 51 of the first rotating sleeve 5 can be quickly and accurately engaged with the first limiting grooves 411 for limiting, realizing a reliable structure.

Referring to FIGS. 1 to 4, a second limiting mechanism for limiting a descending position of the roller shade fabric is provided on the second housing 2, so that the roller shade fabric has a descending limit position. The second limiting mechanism includes a second screw 6 and a second rotating sleeve 7 threadedly sleeved on the second screw 6. The second rotating sleeve 7 moves along an axial direction of the second screw 6 while being rotated. The second screw 6 is fixedly connected to the second housing 2, and the second rotating sleeve 7 is connected to the roller shade drum 3 and rotates synchronously with the roller shade drum 3. A second limiting piece 61 for limiting the second rotating sleeve 7 is provided at one end of the second screw 6 away from the first housing 1, the roller shade drum 3 drives the second rotating sleeve 7 to rotate when the roller shade drum 3 is rotated to drive the roller shade fabric to descend, so that the second rotating sleeve 7 moves towards the second limiting piece 61, and the second rotating sleeve 7 is limited when abutting against the second limiting piece 61. A second limiting step 71 is provided on a side of the second rotating sleeve 7 close to the second limiting piece 61, and a second limiting groove 611 corresponding to the second limiting step 71 is provided on the second limiting piece 61. A plurality of second limiting steps 71 may be arranged in an annular shape with equal intervals, and third guiding bevels 711 are provided on the second limiting steps 71. Fourth guiding bevels 612 matching the third guiding bevels 711 are provided on the second limiting grooves 611, facilitating engaging the second limiting steps 71 with the second limiting grooves 611 for limiting. The second screw 6 is provided with a second external thread 62 for a threaded connection with the second rotating sleeve 7, and the second external thread 62 is provided with a second pitch-increasing thread 621 at one end close to the second limiting piece 61, and the pitch of the second pitch-increasing thread 621 is greater than the pitch of the second external thread 62, so that when the second rotating sleeve 7 is rotated and reaches the second pitch-increasing thread 621, the speed at which the second rotating sleeve 7 approaches the second limiting piece 61 is increased, that is, when the second rotating sleeve 7 is rotated by the same angle, an axial displacement of the second rotating sleeve 7 screwed in along the second pitch-increasing thread 621 is increased, so that the second limiting steps 71 of the second rotating sleeve 7 can be quickly and accurately engaged into the second limiting grooves 611 for limiting, producing a reliable structure. The first screw 4, the second screw 6 and the roller shade drum 3 are arranged coaxially. The first rotating sleeve 5 and the second rotating sleeve 7 both move towards the first limiting piece 41 when the roller shade drum 3 is rotated to drive the roller shade fabric to rise; and the first rotating sleeve 5 and the second rotating sleeve 7 both move towards the second limiting piece 61 when the roller shade drum 3 is rotated to drive the roller shade fabric to descend. The first limiting mechanism and the second limiting mechanism allow the roller shade to be limited at the highest position and the lowest position, providing good user experience.

Referring to FIGS. 2, 5, 6, 7, 8 and 9, a locking and releasing mechanism for locking/releasing a height of the roller shade fabric is provided on the second housing 2. The roller shade fabric is locked by the locking and releasing mechanism when the roller shade fabric rises to a desired height; and the roller shade fabric is released by the locking and releasing mechanism when the roller shade fabric needs to be lowered, so that the roller shade fabric descends under its own gravity. This enables a convenient operation and the user can stop the roller shade at a desired height. The locking and releasing mechanism includes a fixed shaft 8 fixedly connected to the second housing 2, and an end of the fixed shaft 8 away from the second housing 2 is fixedly connected to the second screw 6. A rotating base 81 for connecting the roller shade drum 3 is rotatably mounted on the fixed shaft 8, and the rotating base 81 rotates synchronously with the roller shade drum 3. A sliding groove member 82 and a torsion spring 83 are rotatably sleeved on the fixed shaft 8. An end of the torsion spring 83 is connected to the sliding groove member 82, and a pin at the end of the torsion spring 83 is inserted into the sliding groove member 82. The sliding groove member 82 realizes unidirectional rotation through the torsion spring 83. The rotation direction of the sliding groove member 82 is the same as the rotation direction when the roller shade drum 3 lifts the roller shade fabric. When the sliding groove member 82 rotates in the opposite direction, the torsion spring 83 tightly grips the fixed shaft 8, that is, the sliding groove member 82 cannot rotate in this direction. Two positioning beads 9 are arranged between the rotating base 81 and the sliding groove member 82, and the rotating base 81 is provided with horizontal sliding grooves 811 in which the positioning beads 9 are able to slide horizontally. Two horizontal sliding grooves 811 are provided, corresponding to the two positioning beads 9 respectively. When the rotating base 81 is rotated, the two positioning beads 9 are driven to slide along the two sliding tracks on the sliding groove member 82. The two positioning beads 9 are distributed at 90 degrees about an axis of the sliding groove member 82 as the rotation center. The sliding groove member 82 is provided with a first sliding track 821 and a second sliding track 822 that re communicated with each other. When the locking and releasing mechanism is locked, one of the positioning beads 9 slides to a first positioning part 8211 of the first sliding track 821; when the roller shade fabric rises, the one of the positioning beads 9 slides to a second positioning part 8212 of the first sliding track 821; and when the locking and releasing mechanism is released, both positioning beads 9 slide into the second sliding track 822. Along a circumferential direction of the sliding groove member 82, two first positioning parts 8211 circumferentially distributed at 180 degrees with respect to each other are provided, and two second positioning parts 8212 circumferentially distributed at 180 degrees with respect to each other are provided.

In a normal operation state, the roller shade fabric is suspended at its current height, and the locking release mechanism is locked; one of the positioning beads 9 slides to and is position in the first positioning part 8211 of the first sliding track 821, so that the sliding groove member 82 and the roller shade fabric stop rotating. When the roller shade fabric needs to be lifted, the cord or the pull handle is pulled down so that one of the positioning beads 9 is able to slide to the second positioning part 8212, and the sliding groove member 82 and the rotating base 81 are driven by this positioning bead 9 to rotate synchronously in a direction of lifting the roller shade fabric, thereby realizing ascending of the roller shade fabric. When the cord or the pull handle is pulled up once and released, the one of the positioning beads 9 slides along the first sliding track 821 again to the first positioning part 8211 for positioning so that the sliding groove member 82 and the roller shade fabric stop rotating. The ascending position of the roller shade part can be controlled by pulling up and releasing the cord or the pull handle several times, allowing an easy operation. When the roller shade fabric needs to be lowered, the cord or the pull handle is pulled down by a short distance to force the positioning bead 9 located in the first positioning part 8211 to slide to the second sliding track 822, then the cord or the pull handle is released, and the two positioning beads 9 both slide circumferentially along the second sliding track 822 until the roller shade fabric drops to the preset descending limit position, realizing automatic descending of the roller shade fabric. The cord or the pull handle can also be pulled down at any time as needed during the descending process to interrupt further descent of the roller shade fabric, enabling an easy operation. In this embodiment, two positioning beads 9 are provided, so that a more refined operation of the roller shade fabric can be achieved compared to those with one positioning bead 9. In a case where only one positioning bead 9 is provided, the rotating base 81 needs to be rotated half a circle when the positioning bead 9 slides from the first positioning part 8211 to the second positioning part 8211 during operation, thus the cord or the pull handle needs to be pulled down a longer distance to drive the roller shade fabric to rise, and the cord or the pull handle needs to be pulled down a longer distance before being released in order to suspend the roller shade fabric, which results in a poor user experience. In this embodiment, two positioning beads 9 are arranged at 90 degrees, so that the rotating base 81 only need to rotate ¼ circle, i.e. 90 degrees, along the circumferential direction to drive the positioning beads 9 to slide from the first positioning part 8211 to the second positioning part 8211. The cord or the pull handle only needs to be pulled down a short distance to drive the roller shade fabric to rise, and the cord or the pull handle only needs to be pulled down a short distance before being released to suspend the roller shade fabric, which results in a good user experience.

Referring to FIGS. 1, 2, 4, 6 and 7, a pull handle 10 for driving the roller shade drum 3 to rotate to lift the fabric is provided on the first housing 1, and a cord for driving the roller shade drum 3 to rotate is connected to an upper end of the pull handle 10. The cord is pulled by the pull handle 10 for convenient operation. The end of the first screw 4 away from the first housing 1 is connected to a speed reducer 11 for limiting the speed of the roller shade drum 3 when descending. The second housing 2 includes a rotation adjusting plate 12 for adjusting the height of the descending limit position of the roller shade fabric, the rotation adjusting plate 12 is fixedly connected to the fixed shaft 8, and the rotation adjusting plate 12, the fixed shaft 8 and the second screw 6 rotate synchronously. The rotation adjusting plate 12 is manually rotated to drive the second screw 6 to rotate without rotating the roller shade drum 3, so as to adjust the height of the descending limit position of the roller shade fabric to meet different application scenarios and provide a good user experience. A plug-in square shaft 13 is provided at one end of the fixed shaft 8 close to the second screw 6, and an inclined guide block 15 is provided on the plug-in square shaft 13. A square hole 14 into which the plug-in square shaft 13 is inserted is provided on the second screw 6, and a guiding slot 16 and a limit groove 17 corresponding to the inclined guide block 15 are provided on a sidewall of the square hole 14. The inclined guide block 15 enters the limit groove 17 through the guiding slot 16 and is limited, allowing an easier assembly of the fixed shaft 8 and the second screw 6 and a stable structure after assembly, without the need of bolts or other like for fixing.

The automatic descending structure for roller shade fabric of the present disclosure limits the position of the roller shade fabric through the first limiting mechanism when the fabric rises to the highest position, so that the roller shade fabric cannot be pulled up further, preventing the roller shade fabric from being pulled up excessively and flipped to the other side thus unusable, and enhancing the use experience. The first pitch-increasing thread is provided at one end of the first external thread close to the first limiting piece, and the pitch of the first pitch-increasing thread is greater than the pitch of the first external thread, so that when the first rotating sleeve is rotated and reaches the first pitch-increasing thread, the speed at which the first rotating sleeve approaches the first limiting piece is increased, that is, the axial displacement of the first rotating sleeve screwed in along the first pitch-increasing thread is greater under the same rotated angle, which allows the first limiting step of the first rotating sleeve to be quickly and accurately engaged in the first limiting groove for limiting, and the structure is reliable. The first limiting mechanism and the second limiting mechanism enable the roller shade to be limited at the highest position and the lowest position; when the roller shade fabric rises to the desired height, the roller shade fabric is locked by means of the locking and releasing mechanism; when the roller shade fabric needs to be lowered, the roller shade fabric is released by the locking and releasing mechanism, so that the roller shade fabric descends under its own gravity. This enables an easy operation so that the user can stop the roller shade at the required height. Two positioning beads distributed at 90 degrees are provided, so that the rotating base only needs to be rotated by ¼ circle to drive the positioning beads to slide from the first positioning part to the second positioning part. The cord or the pull handle only needs to be pulled down a short distance to drive the roller shade fabric to rise, and the cord or the pull handle only needs to be pulled down a short distance and then released to suspend the roller shade fabric, which provides a good user experience.

The present disclosure also provides a manually operated roller shade, including the above-mentioned automatic descending structure for roller shade fabric. The manually operated roller shade also has the beneficial effects of the above-mentioned automatic descending structure for roller shade fabric, which will not be repeated herein.

Referring to FIGS. 1, 10, 11 and 13, the manually operated roller shade of the present disclosure includes: a first housing 1 and a pull rod 22. A pull cord 24 for driving the roller shade drum 3 to rotate circumferentially is arranged on the first housing 1, and one end of the pull cord 24 is an external force pulling end 241. The pull rod 22 includes an outer rod 25 and an inner rod 26 which is axially slidable within the outer rod 25, and the external force pulling end 241 is connected to the outer rod 25. A connecting sleeve 27 corresponding to the pull cord 24 is arranged in the inner rod 26, a first wire hole 2701 is formed on an inner side of the connecting sleeve 27, and the pull cord 24 passes through the first wire hole 2701. A cord body 28 is connected between the connecting sleeve 27 and the first housing 1, and a lower end of the cord body 28 penetrates the connecting sleeve 27 in a vertical direction and is knotted to limit the cord body 28. The lower end of the cord body 28 may also be fixed to the connecting sleeve 27 by means of glue or other like. An elastic member 29 is provided between the inner rod 26 and the connecting sleeve 27, and an upper end of the inner rod 26 abuts against the first housing 1 under an elastic force of the elastic member 29. In the pull rod mechanism of the manually operated roller shade of the present disclosure, the pull rod includes an inner rod and an outer rod, and the roller shade fabric is driven to rise by pulling down the outer rod while the inner rod rod of the pull rod remains abutted against the first housing, avoiding danger caused by exposure of the pull cord and ensuring safe and reliable operation. Moreover, this also prevents the pull cord from being exposed and contaminated with dust and other impurities, maintains cleanliness of the pull cord relatively, and ensures smooth pulling of the pull cord.

Referring to FIGS. 10, 11, 15 and 16, a universal connection part is provided between the upper end of the inner rod 26 and the first housing 1. The universal connection part includes an arc-shaped portion 261 provided on the upper end of the inner rod 26 and an arc-shaped notch 2101 provided on the first housing 1, and the arc-shaped portion 261 corresponds to the arc-shaped notch 2101, so that the user can pull down the outer rod at different angles as needed. This can be applied in scenarios in which the user pulls down the outer rod obliquely, enhancing convenience of use. An end cover 262 is fixedly arranged on the upper end of the inner rod 26. The inner rod 26 includes the end cover 262, one end of the elastic member 29 abuts against a bottom part of the end cover 262, the other end of the elastic member 29 abuts against an upper side of the connecting sleeve 27, and the end cover 262 is provided with a second wire hole 2621 for passing the pull cord 24 and the cord body 28, achieving a reasonable structural design. The end cover 262 is threadedly connected and fixed to the upper end of the inner rod 26 to prevent detach of the end cover 262, thereby achieving a stable and reliable structure. The elastic member 29 is a compression spring, and the pull cord 24 and the cord body 28 both pass through the inner diameter hole of the elastic member 29, so that the structure is compact. The end cover 262 is threadedly connected to the upper part of the inner rod 26 through a threaded structure 100, so that the end cover 262 is easy to assemble. Specifically, the threaded structure 100 includes an external thread arranged on the end cover 262 and an internal thread arranged on the inner rod 26, and the external thread corresponds to the internal thread.

Referring to FIGS. 10, 11, 14 and 15, a first limiting part 2801 is provided on an upper part of the cord body 28, and the first limiting part 2801 may be a knot on the cord body 28. A first holding recess 2102 for engaging with and limiting the first limiting part 2801 is provided on the first housing 1, which allows convenient engagement and assembly. Two first holding recesses 2102 are symmetrically arranged on the first housing 1. The cord body 28 includes a first cord body 281 and a second cord body 282, a first connecting part 271 is formed between a lower portion of the first cord body 281 and the connecting sleeve 27, and a second connecting part 272 is formed between a lower portion of the second cord body 282 and the connecting sleeve 27, and the first connecting part 271 and the second connecting part 272 are symmetrically distributed on the connecting sleeve 27, so that the upward pulling forces on the connecting sleeve 27 exerted by the two rope bodies are balanced, avoiding tilting and jamming of the connecting sleeve 27 due to unbalanced forces, and enhancing reliability in use. A shock-absorbing soft sleeve 263 is provided on an outer wall of the upper end of an inner rod 26. In a normal operation state, the upper end of the outer rod 25 abuts against a lower side of the shock-absorbing soft sleeve 263, when the outer rod is pulled down and released, the outer rod moves upward to reset. The arrangement of the shock-absorbing soft sleeve 263 prevents the upper end of the outer rod from directly hitting the first housing which could otherwise cause structural damage, thereby extending the service life. A pull handle 10 is fixedly arranged at a bottom part of the outer rod 25. The outer rod 25 includes the pull handle 10 for ease of griping by the user when pulling down, ensuring user comfort. The external force pulling end 241 is provided with a second limiting part 2411, and the second limiting part 2411 may be a rope knot. The pull handle 10 is provided with a second holding recess 211 for limiting the second limiting part 2411, so that the outer rod 25 is able to drive the pull cord to pull down.

Referring to FIGS. 10, 11, 14 and 17, a rotating disk 212 and a coil spring 213 for driving the rotating disk 212 to reverse and reset are provided on the first housing 1. When the outer rod is pulled down, the coil spring 213 tightens and stores elastic potential energy. After releasing the outer rod, the coil spring 213 releases the elastic potential energy and drives the rotating disk 212 to reverse and reset. This is part of the prior art and will not be described in detail here. The rotating disk 212 is connected to the roller shade drum 3 and rotates synchronously, and part of the pull cord 24 is wound in an annular groove 2121 of the rotating disk 212, so that the pull cord can drive the rotating disk 212 to reverse and reset when it is pulled down. One end of the pull cord 24 away from the external force pulling end 241 is engaged with a third holding recess 2122 of the rotating disk 212, and two cylindrical guiding posts 214 are symmetrically arranged on the first housing 1. According to the different winding directions of the pull cord on the rotating disk 212, selectively, one of the guiding posts 214 may be rotatably sleeved with a rotating wheel 215. This design accommodates different usage scenarios while also making the exterior of the first housing more balanced and aesthetically pleasing. The pull cord 24 is pressed against the rotating wheel 215, and the rotating wheel 215 is driven to rotate by lowering or rising of the pull cord 24, such that the pull cord 24 can be pulled smoothly.

Second Embodiment

Referring to FIGS. 18 to 21, the difference between the second embodiment and the first embodiment is as follows: the outer rod 25 includes a first outer rod 251 and a second outer rod 252 connected to a lower part of the first outer rod 251, a first connecting column 253 is provided on an inner side of a lower part of the first outer rod 251, a second connecting column 254 is provided on an inner side of an upper part of the second outer rod 252, and the first connecting column 253 is threadedly connected with the second connecting column 254; specifically, the first connecting column 253 is provided with an external thread, and the second connecting column 254 is correspondingly provided with an internal thread; the first connecting column 253 is provided with a fourth holding recess 255, the external force pulling end 241 is provided with a second limiting part 2411, and the second limiting part 2411 is engaged with the fourth holding recess 255; a lower part of the first connecting column 253 is provided with an externally threaded column 2531, and an upper part of the second connecting column 254 is provided with an internally threaded tube 2541 threadedly connected to the externally threaded column 2531; an upper part of the first connecting column 253 is provided with a first plug-in part 256 for plugging in the first outer rod 251, and a lower end of the first plug-in part 256 is connected to a first bolt 257 for expanding the first plug-in part 256; the externally threaded column 2531 is provided with an avoidance slot 2532 for avoiding the first bolt 257, the avoidance slot 2532 is able to prevent the externally threaded column 2531 from being expanded by the first bolt 257; the first plug-in part 256 is provided with a protruding rib 2561 for abutting against an inner wall of the first outer rod 251, when the first plug-in part 256 expands, the protruding rib 2561 abuts against the inner wall of the first outer rod 251; two protruding ribs 2561 are symmetrically provided to ensure a more reliable fixation; each protruding rib 2561 includes a strip protruding rib 2562 and an arc protruding rib 2563 integrally connected to the strip protruding rib 2562, so that the abutment is more reliable; the lower part of the second connecting column 254 is provided with a second plug-in part 258 for plugging in the second outer rod 252, and the second plug-in part 258 is connected with a second bolt 259 for expanding the second plug-in part 258, the expanded second plug-in part 258 is tightly fitted and fixed with the inner wall of the second outer rod 252; a plurality of first annular protrusions 2581 are provided on the outer wall of the second plug-in part 258 in a vertical direction, ensuring a firm abutment after expansion; when the second bolt 259 is rotated and inserted into the second plug-in part 258, the first annular protrusions 2581 expand outwardly and press against the inner wall of the second outer rod 252 for fixing; the pull handle 10 is sleeved on an outer side of the lower part of the second outer rod 252, an expansion column 260 is provided on an inner side of the lower part of the second outer rod 252, and a third bolt 2602 is connected to the expansion column 260 for expanding the expansion column 260; after the expansion column 260 expands, the lower part of the second outer rod 252 expands, and a plurality of second annular protrusions 2601 are provided on the outer wall of the expansion column 260 in the vertical direction, ensuring a firm abutment after expansion; when the third bolt 2602 is rotated and inserted into the expansion column 260, the second annular protrusion 2601 expands and drives the lower part of the second outer rod 252 to expand; the lower part of the second outer rod 252 expands to be tightly fitted and fixed with the pull handle 10; the lower part of the pull handle 10 is provided with a mounting through hole 2603 corresponding to the third bolt 2602.

The outer rod of the second embodiment is configured to be longer than that of the first embodiment, and is suitable for shades with higher heights. The outer rod is split into a first outer rod and a second outer rod, which saves packaging space and reduces logistics costs. After receiving the shade, the user can easily assemble the first outer rod and the second outer rod alone. Specifically, upon manufacturing, the first outer rod 251, the first connecting column 253 and the second bolt 259 are assembled into a single unit, and the second outer rod 252, the second connecting column 254, the pull handle 10 and the third bolt 2602 are assembled into a single unit. Upon receiving the product, the user only needs to thread the first connecting column 253 and the second connecting column 254 to complete the assembly between the first outer rod 251 and the second outer rod 252, ensuring easy and convenient operation.

The above descriptions are merely preferred embodiments of the present disclosure. It should be noted that, for those skilled in the art, various modifications and improvements can be made without departing from the technical principles of the disclosure. These modifications and improvements shall also be considered within the scope of protection of the present disclosure.

What is claimed is:

1. An automatic descending structure for roller shade fabric, suitable for being arranged on a manually operated roller shade, comprising: a roller shade fabric controller for controlling lifting and lowering of the roller shade fabric, wherein the roller shade fabric controller comprises a roller shade drum (3), a first housing (1), and a second housing (2) arranged opposite to the first housing (1), the roller shade drum (3) is rotatably arranged between the first housing (1) and the second housing (2), the roller shade drum (3) is connected to the roller shade fabric, and the roller shade fabric is driven to be lifted and lowered by rotation of the roller shade drum (3), and the first housing (1) is provided with a first limiting mechanism for limiting an ascending position of the roller shade fabric, so that the roller shade fabric has an ascending limit position; and the first limiting mechanism comprises a first screw (4) and a first rotating sleeve (5) threadedly sleeved on the first screw (4), the first screw (4) is fixedly connected to the first housing (1), the first rotating sleeve (5) is connected to the roller shade drum (3) and rotates synchronously with the roller shade drum (3), and a first limiting piece (41) for limiting the first rotating sleeve (5) is provided on one end of the first screw (4);

wherein a second limiting mechanism for limiting a descending position of the roller shade is arranged on the second housing (2), so that the roller shade fabric has a descending limit position, the second limiting mechanism comprises a second screw (6) and a second rotating sleeve (7) threadedly sleeved on the second screw (6), the second screw (6) is fixedly connected to the second housing (2), the second rotating sleeve (7) is connected to the roller shade drum (3) and rotates synchronously with the roller shade drum (3), and a second limiting piece (61) for limiting the second rotating sleeve (7) is arranged on one end of the second screw (6).

2. The automatic descending structure for roller shade fabric according to claim 1, wherein the first limiting piece (41) is arranged on the one end of the first screw (4) away from the second housing (2), and the roller shade drum (3) drives the first rotating sleeve (5) to rotate as the roller shade drum (3) rotates to drive the roller shade to rise so that the first rotating sleeve (5) approaches the first limiting piece (41), and the first rotating sleeve (5) is limited when the first rotating sleeve (5) abuts against the first limiting piece (41).

3. The automatic descending structure for roller shade fabric according to claim 2, wherein a first limiting step (51) is provided on a side of the first rotating sleeve (5) close to the first limiting piece (41), and a first limiting groove (411) corresponding to the first limiting step (51) is provided on the first limiting piece (41).

4. The automatic descending structure for roller shade fabric according to claim 3, wherein the first limiting step (51) is one of a plurality of the first limiting steps (51), and the first limiting groove (411) is one of a plurality of first limiting grooves (411) corresponding to the first limiting steps (51), the plurality of the first limiting steps (51) are arranged in an annular manner at equal intervals, first guiding bevels (511) are arranged on the first limiting step (51), and second guiding bevels (412) corresponding to the first guiding bevels (511) are arranged in the first limiting grooves (411).

5. The automatic descending structure for roller shade fabric according to claim 1, wherein the first screw (4) is provided with a first external thread (42) for a threaded connection to the first rotating sleeve (5), and a first pitch-increasing thread (421) is provided at one end of the first external thread (42) close to the first limiting piece (41), and a pitch of the first pitch-increasing thread (421) is greater than a pitch of the first external thread (42).

6. The automatic descending structure for roller shade fabric according to claim 1, wherein the second limiting piece (61) is arranged on an end of the second screw (6) away from the first housing (1), and the roller shade drum (3) drives the second rotating sleeve (7) to rotate as the roller shade drum (3) rotates to drive the roller shade fabric to descend, so that the second rotating sleeve (7) approaches the second limiting piece (61), and the second rotating sleeve (7) is limited when the second rotating sleeve (7) abuts against the second limiting piece (61), a plurality of second limiting steps (71) are arranged on a side of the second rotating sleeve (7) close to the second limiting piece (61), second limiting grooves (611) corresponding to the second limiting steps (71) are arranged on the second limiting piece (61), the plurality of the second limiting steps (71) are arranged in an annular manner at equal intervals, third guiding bevels (711) is arranged on the second limiting steps (71), fourth guiding bevels (612) corresponding to the third guiding bevels (711) are arranged in the second limiting grooves (611), a second external thread (62) for a threaded connection with the second rotating sleeve (7) is arranged on the second screw (6), a second pitch-increasing thread (621) is arranged on an end of the second external thread (62) close to the second limiting piece (61), and a pitch of the second pitch-increasing thread (621) is greater than a pitch of the second external thread (62).

7. The automatic descending structure for roller shade fabric according to claim 1, wherein the first screw (4), the second screw (6) and the roller shade drum (3) are coaxially arranged, when the roller shade drum (3) rotates to drive the roller shade fabric to rise, the first rotating sleeve (5) and the second rotating sleeve (7) both move towards the first limiting piece (41), and when the roller shade drum (3) rotates to drive the roller shade fabric to descend, the first rotating sleeve (5) and the second rotating sleeve (7) both move towards the second limiting piece (61).

8. The automatic descending structure for roller shade fabric according to claim 1, wherein a locking and releasing mechanism for locking/releasing a height of the roller shade fabric is provided on the second housing (2), when the roller shade fabric rises to a desired height, the roller shade fabric is locked by the locking and releasing mechanism, and when the roller shade fabric needs to be lowered, the roller shade fabric is released by the locking and releasing mechanism so as to be lowered under its own gravity, the locking and releasing mechanism comprises a fixed shaft (8) fixedly connected to the second housing (2), an end of the fixed shaft (8) away from the second housing (2) is fixedly connected to the second screw (6), a rotating base (81) for connecting to the roller shade drum (3) is rotatably sleeved on the fixed shaft (8), the rotating base (81) rotates synchronously with the roller shade drum (3), a sliding groove member (82) and a torsion spring (83) are rotatably sleeved on the fixed shaft (8), an end of the torsion spring (83) is connected to the sliding groove member (82), the sliding groove member (82) is able to unidirectionally rotate through the torsion spring (83), and a rotation direction of the sliding groove member (82) is the same as a rotation direction of the roller shade drum (3) when the roller shade fabric rises, two positioning beads (9) are arranged between the rotating base (81) and the sliding groove member (82), and the rotating base (81) is provided with a horizontal slide (811) for the positioning beads (9) to slide horizontally, the two positioning beads (9) are distributed at 90 degrees about an axis of the sliding groove member (82) as a rotation center, the sliding groove member (82) is provided with a first sliding track (821) and a second sliding track (822) communicated with each other, when the locking and releasing mechanism is locked, one of the positioning beads (9) slides to a first positioning part (8211) of the first sliding track (821), when the roller shade fabric rises, one of the positioning beads (9) slides to a second positioning part (8212) of the first sliding track (821), and when the locking and releasing mechanism is released, then positioning beads (9) both slide into the second sliding track (822).

9. The automatic descending structure for roller shade fabric according to claim 8, wherein a pull handle (10) is provided on the first housing (1) for driving the roller shade drum (3) to rotate and the roller shade fabric to rise, a speed reducer (11) is connected to an end of the first screw (4) away from the first housing (1), and the second housing (2) comprises a rotation adjusting plate (12) for adjusting a height of the descending limit position of the roller shade fabric, and the rotation adjusting plate (12) is fixedly connected to the fixed shaft (8).

10. A manually operated roller shade, comprising the automatic descending structure for roller shade fabric according to claim 1.

11. The manually operated roller shade according to claim 10, wherein the manually operated roller shade comprises: a pull rod (22), a pull cord (24) for driving the roller shade drum (3) to rotate circumferentially is arranged on the first housing (1), one end of the pull cord (24) is an external force pulling end (241), the pull rod (22) comprises an outer rod (25) and an inner rod (26) slidably sleeved inside the outer rod (25), the external force pulling end (241) is connected to the outer rod (25), a connecting sleeve (27) is arranged inside the inner rod (26), a first wire hole (2701) corresponding to the pull cord (24) is formed on an inner side of the connecting sleeve (27), a cord body (28) is connected between the connecting sleeve (27) and the first housing (1), an elastic member (29) is arranged between the inner rod (26) and the connecting sleeve (27), and an upper end of the inner rod (26) is pressed against the first housing (1) by an elastic force of the elastic member (29).

12. The manually operated roller shade according to claim 11, wherein a universal connection part is provided between the upper end of the inner rod (26) and the first housing (1), the universal connection part comprises an arc-shaped portion (261) provided on the upper end of the inner rod (26) and an arc-shaped notch (2101) provided on the first housing (1), the arc-shaped portion (261) corresponds to the arc-shaped notch (2101), an end cover (262) is fixedly arranged on the upper end of the inner rod (26), an end of the elastic member (29) abuts against the bottom of the end cover (262), and another other end of the elastic member (29) abuts against an upper side of the connecting sleeve (27), a second wire hole (2621) for passing the pull cord (24) and the cord body (28) is provided on the end cover (262), and the end cover (262) is threadedly connected and fixed to the upper end of the inner rod (26).

13. The manually operated roller shade according to claim 11, wherein the elastic member (29) is a compression spring, the pull cord (24) and the cord body (28) both pass through an inner diameter hole of the elastic member (29), a first limiting part (2801) is provided on an upper part of the cord body (28), and a first holding recess (2102) for engaging with and limiting the first limiting part (2801) is provided on the first housing (1).

14. The manually operated roller shade according to claim 11, wherein the cord body (28) comprises a first cord body (281) and a second cord body (282), a first connecting part (271) is formed between a lower part of the first cord body (281) and the connecting sleeve (27), a second connecting part (272) is formed between a lower part of the second cord body (282) and the connecting sleeve (27), and the first connecting part (271) and the second connecting part (272) are symmetrically distributed on the connecting sleeve (27), a shock-absorbing soft sleeve (263) is provided on an outer wall of the upper end of the inner rod (26), and an upper end of the outer rod (25) abuts against a lower side of the shock-absorbing soft sleeve (263) in a normal state.

15. The manually operated roller shade according to claim 11, wherein a pull handle (10) is fixedly arranged at a bottom part of the outer rod (25), a second limiting part (2411) is provided at the external force pulling end (241), and a second holding recess (211) for limiting the second limiting part (2411) is provided on the pull handle (10), a rotating disk (212) and a coil spring (213) for driving the rotating disk (212) to reverse and reset are provided on the first housing (1), and the rotating disk (212) is connected to the roller shade drum (3) and rotates synchronously, the pull cord (24) is wound in an annular groove (2121) of the rotating disk (212), and an end of the pull cord (24) away from the external force pulling end (241) is engaged in a third holding recess (2122) of the rotating disk (212), two guiding posts (214) are symmetrically arranged on the first housing (1), and a rotating wheel (215) is rotatably sleeved on one of the guiding posts (214), the pull cord (24) is pressed against the rotating wheel (215), and the rotating wheel (215) is driven to rotate by the pull cord (24).

16. The manually operated roller shade according to claim 11, wherein the outer rod (25) comprises a first outer rod (251) and a second outer rod (252) connected to a lower part of the first outer rod (251), a first connecting column (253) is arranged on an inner side of the lower part of the first outer rod (251), a second connecting column (254) is arranged on an inner side of an upper part of the second outer rod (252), and the first connecting column (253) is threadedly connected to the second connecting column (254).

17. The manually operated roller shade according to claim 16, wherein a fourth holding recess (255) is provided on the first connecting column (253), a second limit portion (2411) is provided on the external force pulling end (241), and the second limit part (2411) is engaged with the fourth holding recess (255).

18. The manually operated roller shade according to claim 16, wherein an externally threaded column (2531) is provided in a lower part of the first connecting column (253), an internally threaded tube (2541) threadedly connected to the externally threaded column (2531) is provided in an upper part of the second connecting column (254), a first plug-in part (256) for plugging into the first outer rod (251) is provided on an upper part of the first connecting column (253), a first bolt (257) is connected to a lower end of the first plug-in part (256) for expanding the first plug-in part (256), an avoidance slot (2532) for avoiding the first bolt (257) is provided on the externally threaded column (2531), and a protruding rib (2561) is provided on the first plug-in part (256) for tight fitting against an inner wall of the first outer rod (251), a second plug-in part (258) for plugging in the second outer rod (252) is provided on a lower part of the second connecting column (254), a second bolt (259) is connected to the second plug-in part (258) for expanding the second plug-in part (258), and the second plug-in part (258) after being expanded is tightly fitted and fixed to an inner wall of the second outer rod (252), a plurality of first annular protrusions (2581) are arranged on an outer wall of the second plug-in part (258) in a vertical direction, when the second bolt (259) is rotated and inserted into the second plug-in part (258), the first annular protrusions (2581) expand outwardly and press against and fixed with the inner wall of the second outer rod (252).

19. The manually operated roller shade according to claim 16, wherein the pull handle (10) is sleeved on an outer side of a lower part of the second outer rod (252), an expansion column (260) is arranged on an inner side of the lower part of the second outer rod (252), and a third bolt (2602) is connected to the expansion column (260) for expanding the expansion column (260), the expansion column (260) expands so that the lower part of the second outer rod (252) expands, and a plurality of second annular protrusions (2601) are arranged on an outer wall of the expansion column (260) in a vertical direction, when the third bolt (2602) is rotated and inserted into the expansion column (260), the second annular protrusions (2601) expand outwardly and drive the lower part of the second outer rod (252) to expand, the lower part of the second outer rod (252) after being expanded is tightly fitted and fixed with the pull handle (10), and a mounting through hole (2603) corresponding to the third bolt (2602) is provided in a lower part of the pull handle (10).

20. A manually operated roller shade, comprising an automatic descending structure for roller shade fabric, suitable for being arranged on a manually operated roller shade, comprising: a roller shade fabric controller for controlling lifting and lowering of the roller shade fabric, wherein the roller shade fabric controller comprises a roller shade drum (3), a first housing (1), and a second housing (2) arranged opposite to the first housing (1), the roller shade drum (3) is rotatably arranged between the first housing (1) and the second housing (2), the roller shade drum (3) is connected to the roller shade fabric, and the roller shade fabric is driven to be lifted and lowered by rotation of the roller shade drum (3), and the first housing (1) is provided with a first limiting mechanism for limiting an ascending position of the roller shade fabric, so that the roller shade fabric has an ascending limit position; and the first limiting mechanism comprises a first screw (4) and a first rotating sleeve (5) threadedly sleeved on the first screw (4), the first screw (4) is fixedly connected to the first housing (1), the first rotating sleeve (5) is connected to the roller shade drum (3) and rotates synchronously with the roller shade drum (3), and a first limiting piece (41) for limiting the first rotating sleeve (5) is provided on one end of the first screw (4);

wherein the manually operated roller shade comprises: a pull rod (22), a pull cord (24) for driving the roller shade drum (3) to rotate circumferentially is arranged on the first housing (1), one end of the pull cord (24) is an external force pulling end (241), the pull rod (22) comprises an outer rod (25) and an inner rod (26) slidably sleeved inside the outer rod (25), the external force pulling end (241) is connected to the outer rod (25), a connecting sleeve (27) is arranged inside the inner rod (26), a first wire hole (2701) corresponding to the pull cord (24) is formed on an inner side of the connecting sleeve (27), a cord body (28) is connected between the connecting sleeve (27) and the first housing (1), an elastic member (29) is arranged between the inner rod (26) and the connecting sleeve (27), and an upper end of the inner rod (26) is pressed against the first housing (1) by an elastic force of the elastic member (29).

* * * * *